(12) United States Patent
Bertz et al.

(10) Patent No.: US 11,589,295 B1
(45) Date of Patent: Feb. 21, 2023

(54) NETWORK FUNCTION PROVISIONING OVER THIRD GENERATION PARTNERSHIP PROJECT (3GPP) LINKS

(71) Applicant: T-Mobile Innovations LLC, Overland Park, KS (US)

(72) Inventors: Lyle T. Bertz, Lee's Summit, MO (US); Laurent Alexandre Laporte, Spring Hill, KS (US); Tracy Lee Nelson, Overland Park, KS (US); Galip Murat Karabulut, Vienna, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 162 days.

(21) Appl. No.: 17/205,201

(22) Filed: Mar. 18, 2021

(51) Int. Cl.
| | |
|---|---|
| *H04W 40/00* | (2009.01) |
| *H04W 24/10* | (2009.01) |
| *H04W 4/70* | (2018.01) |
| *H04W 48/16* | (2009.01) |

(52) U.S. Cl.
CPC ........... *H04W 48/16* (2013.01); *H04W 24/10* (2013.01)

(58) Field of Classification Search
CPC . H04W 48/16; H04W 24/04; H04W 36/0022; H04W 4/24; H04W 76/12; H04W 24/10; H04W 28/24; H04W 4/70; H04W 36/0033; H04W 36/0079; H04L 47/2425; H04L 47/74; H04L 47/762; H04L 12/1407; H04M 15/66
USPC .......................................................... 370/254
See application file for complete search history.

(56) References Cited

U.S. PATENT DOCUMENTS

| | | | |
|---|---|---|---|
| 10,716,096 | B2 | 7/2020 | Yu et al. |
| 10,742,396 | B2 | 8/2020 | Suthar et al. |
| 10,785,696 | B2 | 9/2020 | Li et al. |
| 10,812,977 | B2 | 10/2020 | Li et al. |
| 2017/0332421 | A1 | 11/2017 | Sternberg et al. |
| 2019/0150219 | A1 | 5/2019 | Wang et al. |

*Primary Examiner* — Edan Orgad
*Assistant Examiner* — Vanneilian Lalchinthang

(57) ABSTRACT

In a wireless communication network, a provisioning system transfers a Session Management Function (SMF) Application Programming Interface (API) call for a User Plane Function (UPF) metric to an SMF. The SMF transfers a UPF API call for the UPF metric to the UPF over signaling. The UPF transfers a UPF API response indicating the UPF metric to the SMF over signaling. The SMF transfers an SMF API response indicating the UPF metric to the provisioning system. The provisioning system may obtain UE metrics through the SMF or an Access and Mobility Management Function (AMF) in a like manner. The provisioning system may obtain Radio Access Network (RAN) metrics through the SMF or AMF in a like manner.

20 Claims, 18 Drawing Sheets

NETWORK FUNCTION PROVISIONING OVER THIRD GENERATION PARTNERSHIP PROJECT (3GPP) LINKS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The wireless access nodes are connected to the wireless network cores over backhaul data links.

Provisioning entails the remote configuration of the wireless user device, wireless access nodes, and network elements. For example, an Orchestration, Administration, and Maintenance (OAM) provisioning controller may remotely configure a wireless access node to implement a new handover procedure. The OAM provisioning controller may remotely configure a network element to deploy an enhanced content filter. The OAM provisioning controller may remotely configure a wireless user device to use different network access credentials.

Some wireless user devices and access nodes use Third Generation Partnership Project (3GPP) technologies like 5GNR gNodeBs and LTE eNodeBs. The 3GPP user devices wirelessly communicate with the 3GPP access nodes. The 3GPP access nodes communicate with 3GPP network cores. Other wireless user devices and access nodes use non-3GPP technologies like Institute of Electrical and Electronic Engineers (IEEE) 802.11 (WIFI) and IEEE 802.3 (ENET). 3GPP user devices also communicate with the non-3GPP access nodes. The non-3GPP access nodes communicate with the 3GPP network cores and typically other data networks.

The 3GPP network cores feature 3GPP network elements like Access and Mobility Management Function (AMF), Session Management Function (SMF), User Plane Function (UPF), and Non-3GPP Interworking Function (N3IWF). In the network cores, the N3IWFs communicate with the 3GPP AMFs over N2 links. The N3IWFs communicate with the 3GPP UPFs over N3 links. The AMFs and UPFs in the 3GPP cores communicate with the 3GPP access nodes over N2 and N3 links. The SMFs communicate with the UPFs over N4 links. The UPFs communicate with external data networks over N6 links. The AMFs communicate with the SMFs over N11 links. The N3IWFs communicate with the non-3GPP access nodes over Y2 and NWu links.

The 3GPP user devices and the 3GPP access nodes communicate over Radio Resource Control (RRC) links. The 3GPP user devices and the non-3GPP access nodes communicate over Y1 links. The 3GPP user devices communicate with the N3IWFs over the NWu links. The 3GPP user devices and the 3GPP AMFs in the 3GPP cores communicate over N1 links that traverse the RRC and N2 links. The 3GPP user devices and the 3GPP AMFs in the 3GPP cores also communicate over additional N1 links that traverse the NWu links.

The provisioning controller remotely loads triggering events on the wireless user devices, access nodes, and network functions over N3, N6, and RRC links. The wireless user devices, access nodes, and network functions export provisioning data to the provisioning controller over the N3, N6, and RRC links in response to the triggering events. Unfortunately, the N3, N6, and RRC links also carry user traffic across the user plane. Thus, the provisioning controller shares network resources with the wireless user devices and provisioning suffers during network overloads. Moreover, UPFs do not efficiently and effectively export their telemetry to the provisioning controller.

TECHNICAL OVERVIEW

In a wireless communication network, a provisioning system transfers a Session Management Function (SMF) Application Programming Interface (API) call for a User Plane Function (UPF) metric to an SMF. The SMF transfers a UPF API call for the UPF metric to the UPF over signaling. The UPF transfers a UPF API response indicating the UPF metric to the SMF over signaling. The SMF transfers an SMF API response indicating the UPF metric to the provisioning system. The provisioning system may obtain UE metrics through the SMF or an Access and Mobility Management Function (AMF) in a like manner. The provisioning system may obtain Radio Access Network (RAN) metrics through the SMF or AMF in a like manner.

DETAILED DESCRIPTION

Figure 1:
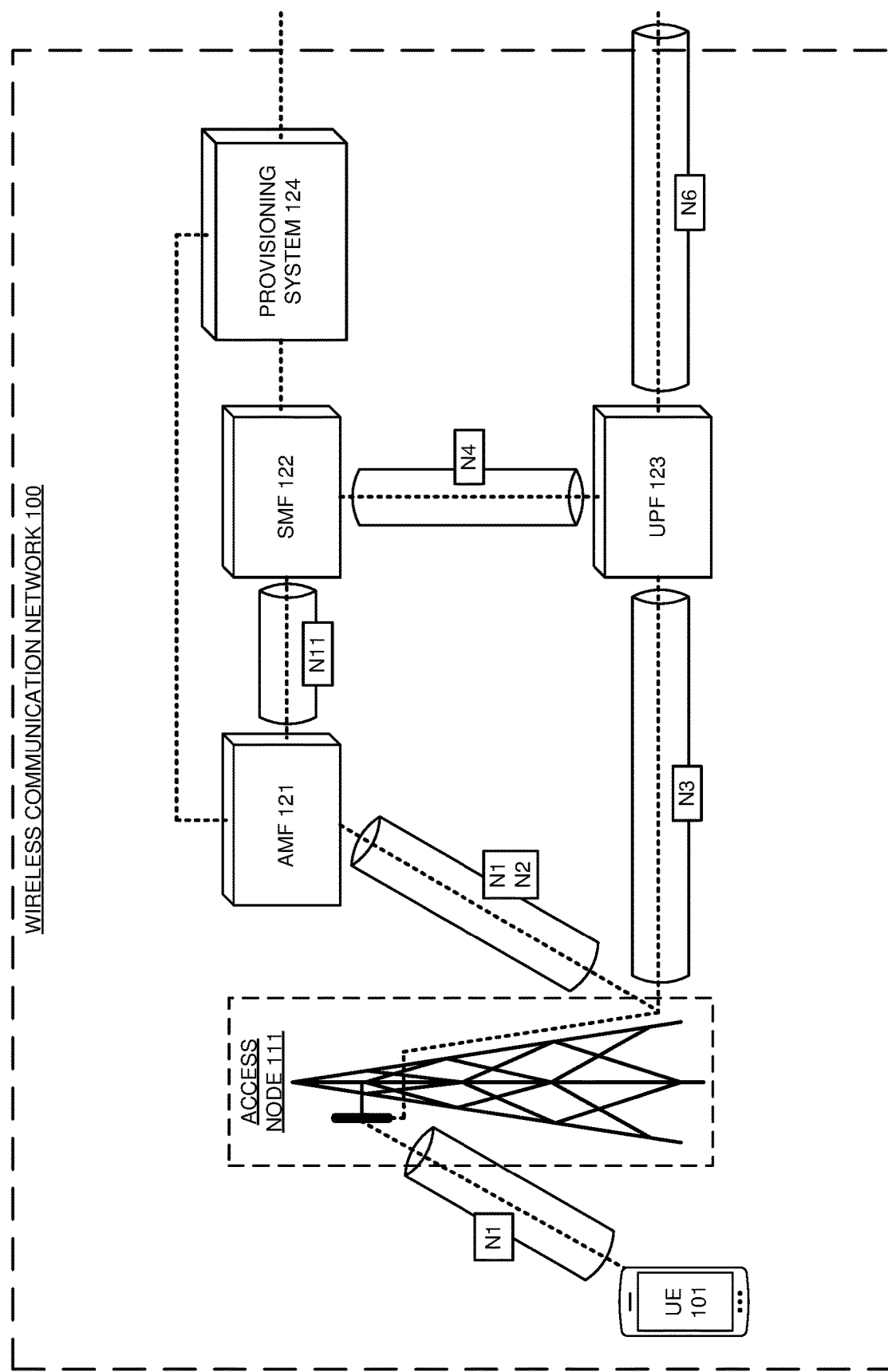
FIG. 1 illustrates a wireless communication network to provision network functions over Third Generation Partnership Project (3GPP) signaling links.

FIG. 1 illustrates wireless communication network 100 to provision network functions over Third Generation Partnership Project (3GPP) signaling links. Wireless communication network 100 delivers services to UE 101 like internet-access, machine communications, media-streaming, or some other data communications product. Wireless communication network 100 comprises UE 101, access node 111, 3GPP Access and Mobility Management Function (AMF) 121, 3GPP Session Management Function (SMF) 122, 3GPP User Plane Function (UPF) 123, and provisioning system 124.

Various examples of network operation and configuration are described herein. In some examples, UPF 123 exchanges user data with UE 101 over access node 111. Provisioning system 124 transfers an SMF Application Programming Interface (API) call for a UPF metric to SMF 122. For example, provisioning system 124 may be directed by a network operator to determine the number of active users served by UPF 123 and may transfer an SMF API call to SMF 122 for the number of active users served by UPF 123. SMF 122 receives the SMF API call. SMF 122 responsively transfers a UPF API call for the UPF metric in a 3GPP N4 signaling message to UPF 123. UPF 123 receives the UPF API call for the UPF metric in the 3GPP N4 signaling message. In response to the UPF API call, UPF 123 determines the UPF metric and transfers a UPF API response indicating the UPF metric in another 3GPP N4 signaling message to SMF 122. SMF 122 receives the UPF API response indicating the UPF metric in the other 3GPP N4 signaling message. SMF 122 responsively transfers an SMF API response indicating the UPF metric to provisioning system 124. Provisioning system 124 receives the SMF API response indicating the UPF metric. Advantageously, provisioning system 124 does not share user plane resources with UEs and is less affected by network overloads. Moreover, UPF 123 efficiently and effectively exports its telemetry to provisioning system 124 over the N4 and SMF 122.

UE 101 and access node 111 communicate over links using wireless technologies like Institute of Electrical and Electronic Engineers (IEEE) 802.11 (WIFI), IEEE 802.3 (ENET), Bluetooth, Fifth Generation New Radio (5GNR), Long Term Evolution (LTE), Low-Power Wide Area Network (LP-WAN), and/or some other 3GPP protocol or non-3GPP protocol. The wireless technologies use electromagnetic frequencies in the low-band, mid-band, high-band, or some other portion of the electromagnetic spectrum. The various links (N1, N2, N3, N4, N6, N11) use metallic links, glass fibers, radio channels, or some other communication media. The links use IEEE 802.3 (Ethernet), Time Division Multiplex (TDM), Data Over Cable System Interface Specification (DOCSIS), Internet Protocol (IP), General Packet Radio Service Transfer Protocol (GTP), 5GNR, LTE, WIFI, Fifth Generation Core (5GC), virtual switching, inter-processor communication, bus interfaces, and/or some other data communication protocols.

UE 101 comprises a computer, phone, vehicle, sensor, robot, or some other data appliance with wireless and/or wireline communication circuitry. Access node 111 is depicted as a tower but access node 111 may use another mounting structure or no mounting structure at all. Access node 111 may comprise 5G Radio Access Networks (5G RANs), LTE RANs, gNodeBs, eNodeBs, NB-IoT access nodes, LP-WAN base stations, wireless relays, WIFI hotspots, ENET access nodes, Bluetooth access nodes, and/or other wireless network transceivers. UE 101 and access node 111 comprise antennas, amplifiers, filters, modulation, analog/digital interfaces, microprocessors, software, memories, transceivers, bus circuitry, and the like. Network functions 121-124 comprise, microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
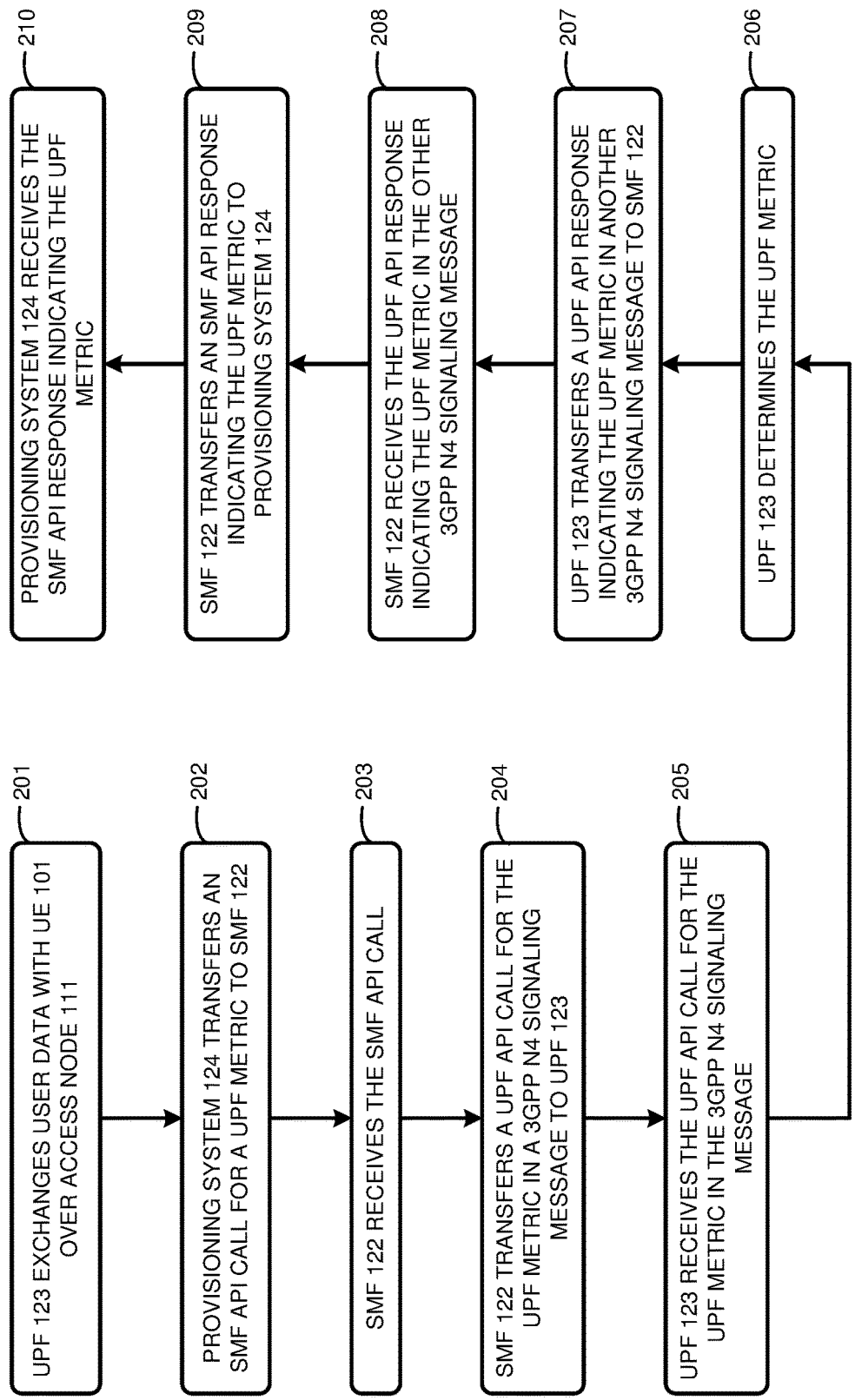
FIG. 2 illustrates an exemplary operation of the wireless communication network to provision the network functions over the 3GPP signaling links.

FIG. 2 illustrates an exemplary operation of wireless communication network 100 to provision network functions over 3GPP signaling. The operation may vary in other examples. UPF 122 exchanges user data with UE 101 over access node 111 (201). Provisioning system 124 transfers an SMF API call for a UPF metric to SMF 122 (202). SMF 122 receives the SMF API call (203). SMF 122 transfers a UPF API call for the UPF metric in a 3GPP N4 signaling message to UPF 123 (204). UPF 123 receives the UPF API call for the UPF metric in the 3GPP N4 signaling message (205). For example, the UPF metric may comprise Inter Public Land Mobility Network User Plane Security (IPUPS) data and UPF 123 may receive a UPF API call requesting IPUPS data. UPF 123 determines the UPF metric (206). UPF 123 transfers a UPF API response indicating the UPF metric in a 3GPP N4 signaling message to SMF 122 (207). SMF 122 receives the UPF API response indicating the UPF metric in the 3GPP N4 signaling message (208). SMF 122 transfers an SMF API response indicating the UPF metric to provisioning system 124 (209). Provisioning system 124 receives the SMF API response indicating the UPF metric (210).

Figure 3:
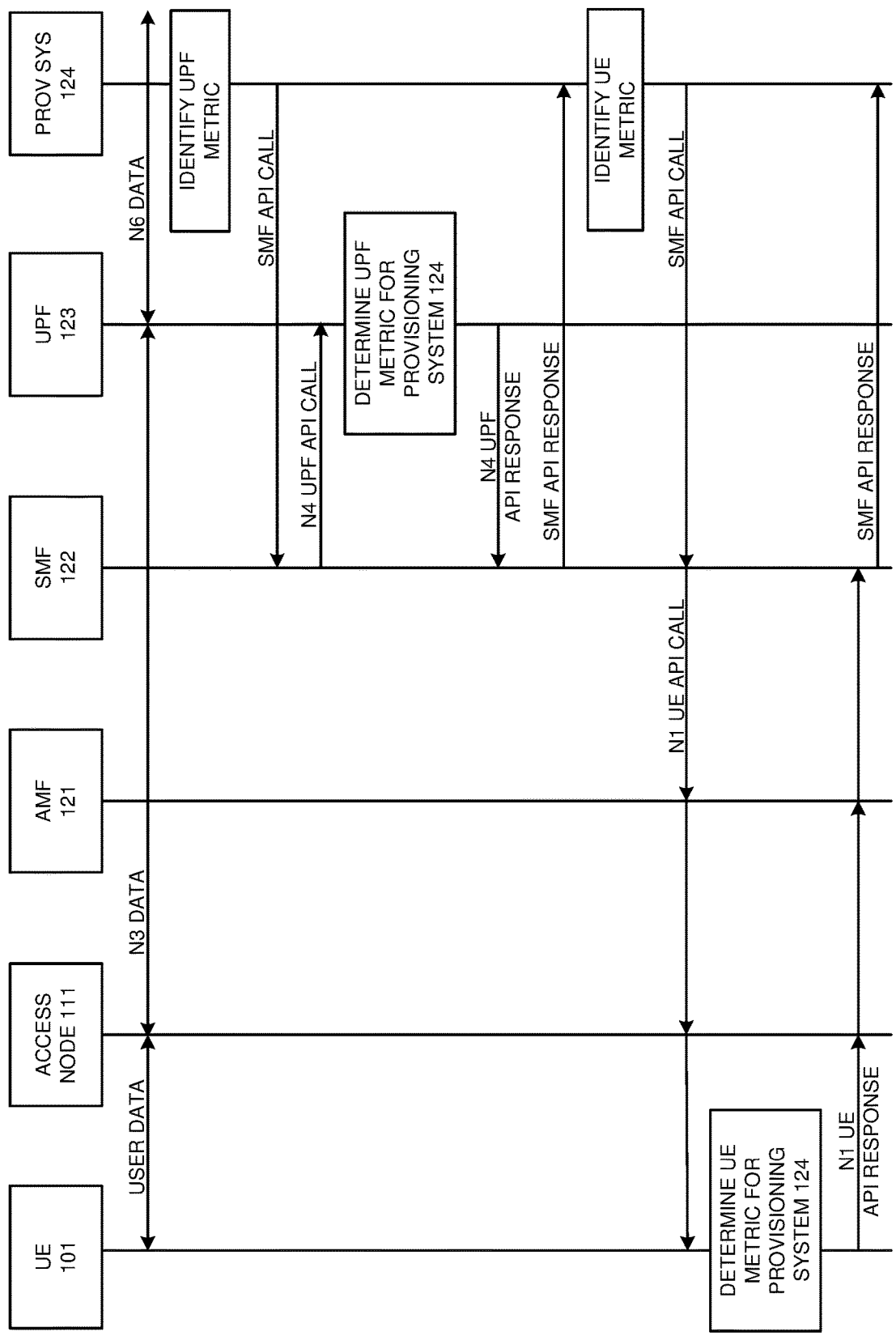
FIG. 3 illustrates another exemplary operation of the wireless communication network to provision the network functions and a wireless User Equipment (UE) over the 3GPP signaling links.

FIG. 3 illustrates another operation of wireless communication network 100 to provision network functions and network elements over 3GPP signaling links. The operation is exemplary and may vary in other examples. UPF 123 exchanges N3 data for UE 101 with access node 111. Access node 111 wirelessly exchanges user data with UE 101. UPF 123 exchanges N6 data for UE 101 with external data networks. In some examples, access node 111 exchanges the user data with UE 101 over a wired connection instead of a wireless link.

Provisioning system 124 identifies a UPF metric for measurement. For example, provisioning system 124 may receive a request from a network operator to retrieve user plane data like IPUPS from UPF 123. In response to the identified UPF metric, provisioning system 124 transfers an SMF API call to SMF 122. The SMF API call identifies UPF 123 as the target UPF and identifies the desired UPF metric(s). SMF 122 receives the SMF API call and responsively transfers a UPF API call for the UPF metric in an N4 signaling message to UPF 123. UPF 123 receives the UPF API call in the N4 signaling message and responsively determines the UPF metric for provisioning system 124.

UPF 123 transfers a UPF API response indicating the UPF metric in an N4 signaling to SMF 122. SMF 122 receives the UPF API response in the N4 signaling message and responsively transfers an SMF API response indicating the UPF metric to provisioning system 124. Provisioning system 124 receives the SMF API response. Provisioning system 124 may report the UPF metric to a network operator, transfer or rescind resources from UPF 123, or perform some other type of provisioning operation in response to receiving the UPF metric.

In a like manner, provisioning system 124 identifies a UE metric for UE 101. Provisioning system 124 transfers an SMF API call for the UE metric to SMF 122. SMF 122 receives the SMF API call. SMF 122 transfers a UE API call for the UE metric in an N1 signaling message to AMF 121 over the N11 link. AMF 121 forwards the UE API call in the N1 signaling message to access node 111. Access node 111 transfers the UE API call in the N1 signaling message to UE 101. UE 101 determines the UE metric for provisioning system 124 and transfers a UE API response in another N1 signaling message to access node 111. Access node 111 forwards the UE API response to AMF 121. AMF 121 forwards the UE API response in the other N1 signaling message over the N11 links to SMF 122. SMF 122 receives the UE API response and transfers an SMF API response that indicates the UE metric to provisioning system 124.

Figure 4:
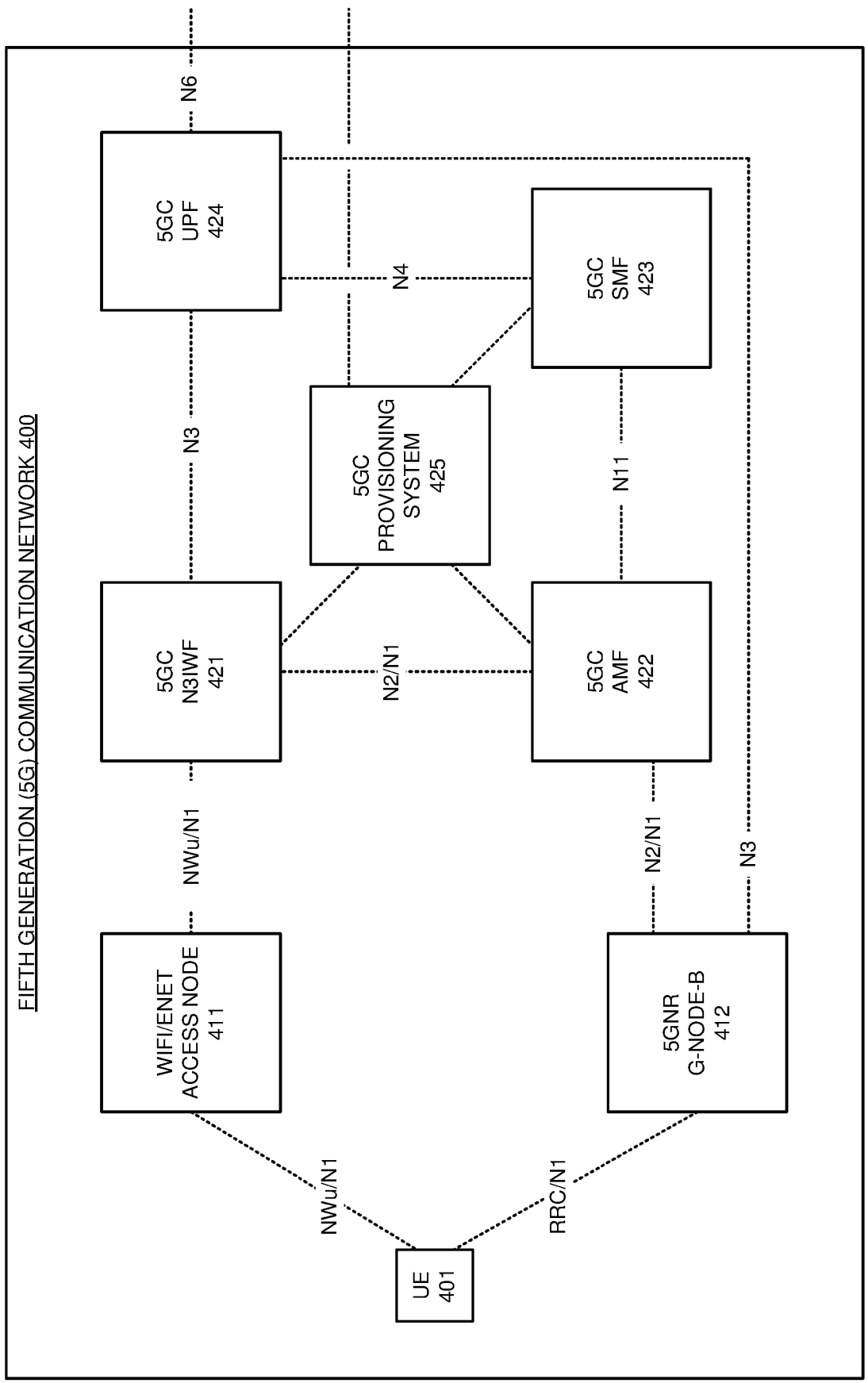
FIG. 4 illustrates a Fifth Generation (5G) communication network to provision network functions, a 3GPP access node, a non-3GPP access node, and a UE over 3GPP signaling links.

FIG. 4 illustrates Fifth Generation (5G) communication network 400 that comprises provisions network functions of Third Generation Partnership Project (3GPP) links. 5G communication network 400 comprises an example of wireless communication network 100, although network 100 may vary from this example. 5G communication network 400 comprises 5GNR/WIFI/ENET UE 401, WIFI/ENET access node 411, 5GNR gNodeB 412, Fifth Generation Core (5GC) Non-3GPP Interworking Function (N3IWF) 421, 5GC AMF 422, 5GC SMF 423, 5GC UPF 424, and 5GC provisioning system 425. 5GNR gNodeB 412 comprises a 3GPP access node and WIFI/ENET access node 411 comprises a non-3GPP access node.

UE 401 attaches to WIFI/ENET access node 411. UE 401 registers with N3IWF 421 over WIFI/ENET access node 411. UE 401 and N3IWF 421 establish an NWu over WIFI/ENET access node 411. UE 401 registers with 5GC AMF 422 over the NWu and N2 that traverse WIFI/ENET access node 411 and N3IWF 421. UE 401 and 5GC AMF 422 establish an N1 over the NWu and N2 that traverse WIFI/ENET access node 411 and N3IWF 421. 5GC AMF 422 signals N3IWF 421 over the N2 to serve UE 401 over the N3 between N3IWF 421 and 5GC UPF 424. 5GC AMF 422 signals 5GC SMF 423 over the N11 to serve UE 401 over the N3 between N3IWF 421 and 5GC UPF 424. 5GC SMF 423 signals 5GC UPF 424 over the N4 to serve UE 401 over the N6 and over the N3 between N3IWF 421 and 5GC UPF 424. 5GC AMF 422 signals UE 401 over the N1 which traverses the N2 and NWu that traverse N3IWF 121 and WIFI/ENET access node 411. UE 401 and 5GC N3IWF 121 exchange user data over the NWu that traverses WIFI/ENET access node 411. 5GC N3IWF 421 and 5GC UPF 424 exchange the user data over the N3. 5GC UPF 424 exchanges the user data with external data networks over the N6.

UE 401 also attaches to 5GNR gNodeB 412 and establishes a Radio Resource Control (RRC) connection. UE 401 registers with 5GC AMF 422 over the RRC and N2 that traverse 5GNR gNodeB 412. UE 401 and 5GC AMF 422 establish an N1 over the RRC and N2 that traverse 5GNR gNodeB 412. 5GC AMF 422 signals 5GNR gNodeB 412 over the N2 to serve UE 401 over an N3 between 5GNR gNodeB 412 and 5GC UPF 424. 5GC AMF 422 signals 5GC SMF 423 over the N11 to serve UE 401 over the N3 between 5GNR gNodeB 412 and 5GC UPF 424. 5GC SMF 423 signals 5GC UPF 424 over the N4 to serve UE 401 over the N3 between 5GNR gNodeB 412 and 5GC UPF 424. 5GNR gNodeB 412 signals UE 401 over the RRC to use a bearer that traverses the RRC, gNodeB 412, N3, UPF 424, and N6. UE 401 and 5GNR gNodeB 412 exchange user data over the RRC. 5GNR gNodeB 412 and 5GC UPF 424 exchange the user data over the N3. 5GC UPF 424 exchanges the user data with external data networks over the N6.

5GC provisioning system 425 receives a request from a network operator for a UPF metric for 5GC UPF 424. The UPF metric comprises UPF telemetry, UPF load, UPF latency, UPF IPUPS functionality, and/or some other type of UPF metric. 5GC provisioning system 425 transfers an SMF API call for the UPF metric to 5GC SMF 423. 5GC SMF 423 receives the SMF API call for the UPF metric and responsively transfers a UPF API call for the UPF metric to 5GC UPF 424 over the N4. 5GC UPF 424 receives the UPF API call and responsively identifies the UPF metric. For example, the UPF API call may request UPF in-band telemetry from 5GC UPF 424 and 5GC UPF 424 may responsively identify which data measurements it is currently recording. 5GC UPF 424 transfers a UPF API response that indicates the UPF metric to 5GC SMF 423 over the N4. 5GC SMF 423 transfers an SMF API response that indicates the UPF metric to provisioning system 425. 5GC provisioning system 425 receives the SMF API response and reports the UPF metric to the network operator. Advantageously, provisioning system 425 drives SMF 423 to transfer API calls to 5GC UPF 424 to exposes user plane data from 5GC UPF 424 to the control plane.

In some examples, 5GC provisioning system 425 receives a request from the network operator for a UE metric for UE 401. The UE metric comprises UE capabilities, UE slice Identifiers (IDs), and/or some other type of UE metric. 5GC provisioning system 425 transfers an SMF API call for the UE metric to 5GC SMF 423. 5GC SMF 423 receives the SMF API call for the UE metric and responsively transfers a UE API call for the UE metric in N1 signaling to 5GC AMF 422 over the N11. 5GC AMF 422 receives the UE API call in the N1 signaling and responsively transfers the UE API call towards UE 401 over the N1. 5GC AMF 422 may transfer the UE API call over the N1 that traverses 5GC N3IWF 421 and WIFE/ENET access node 411 and/or the N1 that traverses SGNR gNodeB 412. UE 401 receives the UE API call for the UE metric over the N1 that traverses 5GC N3IWF 421 and WIFE/ENET access node 411 and/or the N1 that traverses SGNR gNodeB 412. In response, UE 401 identifies the UE metric and transfers a UE API response indicating the UE metric towards 5GC AMF 422 over the N1. UE 401 may transfer the UE API response to 5GC AMF 422 over either of the N1 signaling paths. 5GC AMF 422 receives the UE API response and forwards the UE API response in N1 signaling to 5GC SMF 423 over the N11.

5GC SMF 423 transfers an SMF API response that indicates the UE metric to 5GC provisioning system 425. Provisioning system 425 reports the UE metric to the network operator.

In some examples, 5GC provisioning system 425 receives a request from the network operator for a UE metric for UE 401. 5GC provisioning system 425 transfers an AMF API call for the UE metric to 5GC AMF 422. 5GC AMF 422 receives the AMF API call for the UE metric and responsively transfers a UE API call for the UE metric in N1 signaling towards UE 401 over the N1. 5GC AMF 422 may transfer the UE API call over the N1 that traverses 5GC N3IWF 421 and WIFE/ENET access node 411 and/or the N1 that traverses SGNR gNodeB 412. UE 401 receives the UE API call for the UE metric over the N1 that traverses 5GC N3IWF 421 and WIFE/ENET access node 411 and/or the N1 that traverses SGNR gNodeB 412. In response, UE 401 identifies the UE metric and transfers a UE API response indicating the UE metric towards 5GC AMF 422 over the N1. UE 401 may transfer the UE API response to 5GC AMF 422 over either of the N1 signaling paths. 5GC AMF 422 receives the UE API response and transfers an AMF API response that indicates the UE metric to 5GC provisioning system 425. Provisioning system 425 reports the UE metric to the network operator.

In some examples, 5GC provisioning system 425 receives a request from the network operator for an access node metric for 5GNR gNodeB 412. The access node metric comprises access node load, capabilities, Radio Access Technology (RAT) type, amount of active users, and/or some other type of access node metric. 5GC provisioning system 425 transfers an SMF API call for the access node metric to 5GC SMF 423. 5GC SMF 423 receives the SMF API call for the access node metric and responsively transfers an access node API call for the access node metric in N2 signaling to 5GC AMF 422 over the N11. 5GC AMF 422 receives the access node API call in N2 signaling and responsively transfers the access node API call to 5GNR gNodeB over the N2. 5GNR gNodeB 412 receives the access node API call for the access node metric over the N2. In response, 5GNR gNodeB 412 identifies the access node metric and transfers an access node API response indicating the access node metric to 5GC AMF 422 over the N2. 5GC AMF 422 receives the access node API response and forwards the access node API response in N2 signaling to 5GC SMF 423 over the N11. 5GC SMF 423 transfers an SMF API response to 5GC provisioning system 425. 5GC provisioning system 425 reports the access node metric to the network operator.

In some examples, 5GC provisioning system 425 receives a request from the network operator for an access node metric for 5GNR gNodeB 412. 5GC provisioning system 425 transfers an AMF API call for the access node metric to 5GC AMF 422. 5GC AMF 422 receives the AMF API call for the access node metric and responsively transfers an access node API call for the access node metric in N2 signaling to 5GNR gNodeB over the N2. 5GNR gNodeB 412 receives the access node API call for the access node metric over the N2. In response, 5GNR gNodeB 412 identifies the access node metric and transfers an access node API response indicating the access node metric to 5GC AMF 422 over the N2. 5GC AMF 422 receives the access node API response and transfers an AMF API response to 5GC provisioning system 425. 5GC provisioning system 425 reports the access node metric to the network operator.

In some examples, 5GC provisioning system 425 receives a request from the network operator for an access node metric for WIFI/ENET access node 411. 5GC provisioning system 425 transfers an SMF API call for the access node metric to 5GC SMF 423. 5GC SMF 423 receives the SMF API call for the access node metric and responsively transfers an access node API call for the access node metric in N2 signaling to 5GC AMF 422 over the N11. 5GC AMF 422 receives the access node API call in N2 signaling and responsively transfers the access node API call to 5GC N3IWF 421 over the N2. 5GC N3IWF 421 transfers the access node API call to WIFI/ENET access node 411 over provisioning links. WIFI/ENET access node 411 receives the access node API call for the access node metric over the provisioning links. In response, WIFI/ENET access node 411 identifies the access node metric and transfers an access node API response indicating the access node metric to 5GC N3IWF 421 over the non-3GPP signaling links. 5GC N3IWF 421 transfers the access node API response to 5GC AMF 422 over the N2. 5GC AMF 422 receives the access node API response and forwards the access node API response in N2 signaling to 5GC SMF 423 over the N11. 5GC SMF 423 transfers an SMF API response to 5GC provisioning system 425. 5GC provisioning system 425 reports the access node metric to the network operator.

In some examples, 5GC provisioning system 425 receives a request from the network operator for an access node metric for WIFI/ENET access node 411. 5GC provisioning system 425 transfers an AMF API call for the access node metric to 5GC AMF 422. 5GC AMF 422 receives the AMF API call for the access node metric and responsively transfers an access node API call for the access node metric to 5GC N3IWF 421 over the N2. 5GC N3IWF 421 transfers the access node API call to WIFI/ENET access node 411 over provisioning links. WIFI/ENET access node 411 receives the access node API call for the access node metric over the provisioning links. In response, WIFI/ENET access node 411 identifies the access node metric and transfers an access node API response indicating the access node metric to 5GC N3IWF 421 over the non-3GPP signaling links. 5GC N3IWF 421 transfers the access node API response to 5GC AMF 422 over the N2. 5GC AMF 422 receives the access node API response and transfers an AMF API response to 5GC provisioning system 425. 5GC provisioning system 425 reports the access node metric to the network operator.

In some examples, 5GC provisioning system 425 receives a request from the network operator for an N3IWF metric for 5GC N3IWF 411. The N3IWF metric comprises access node connections, un-trusted access settings, load, or some other type of N3IWF metric. 5GC provisioning system 425 transfers an SMF API call for the N3IWF metric to 5GC SMF 423. 5GC SMF 423 receives the SMF API call for the N3IWF metric and responsively transfers an N3IWF API call for the access node metric in N2 signaling to 5GC AMF 422 over the N11. 5GC AMF 422 receives the N3IWF API call in N2 signaling and responsively transfers the N3IWF API call to 5GC N3IWF 421 over the N2. 5GC N3IWF 421 receives the N3IWF API call for the access node metric over the N2. In response, 5GC N3IWF 421 identifies the N3IWF metric and transfers an N3IWF API response indicating the N3IWF metric to 5GC AMF 422 over the N2. 5GC AMF 422 receives the N3IWF API response and forwards the access node API response in N2 signaling to 5GC SMF 423 over the N11. 5GC SMF 423 transfers an SMF API response to 5GC provisioning system 425. 5GC provisioning system 425 reports the N3IWF metric to the network operator.

In some examples, 5GC provisioning system 425 receives a request from the network operator for an N3IWF metric for 5GC N3IWF 411. The N3IWF metric comprises RAT type connections, load, or some other type of N3IWF metric. 5GC provisioning system 425 transfers an AMF API call for the N3IWF metric to 5GC AMF 422. 5GC SMF 423 receives the AMF API call for the N3IWF metric and responsively transfers an N3IWF API call for the access node metric to 5GC N3IWF 421 over the N2. 5GC N3IWF 421 receives the N3IWF API call for the access node metric over the N2. In response, 5GC N3IWF 421 identifies the N3IWF metric and transfers an N3IWF API response indicating the N3IWF metric to 5GC AMF 422 over the N2. 5GC AMF 422 receives the N3IWF API response and transfers an AMF API response to 5GC provisioning system 425. 5GC provisioning system 425 reports the N3IWF metric to the network operator.

In some examples, 5GC provisioning system 425 receives a request from the network operator for an access node metric for WIFI/ENET access node 411. 5GC provisioning system 425 transfers an N3IWF API call for the access node metric to 5GC N3IWF 421. 5GC N3IWF 421 receives the N3IWF API call for the access node metric and responsively transfers an access node API call for the access node metric to WIFI/ENET access node 411 over provisioning links (PROV). WIFI/ENET access node 411 receives the access node API call for the access node metric over the provisioning links. In response, WIFI/ENET access node 411 identifies the access node metric and transfers an access node API response indicating the access node metric to 5GC N3IWF 421 over the non-3GPP signaling links. 5GC N3IWF 421 transfers an N3IWF API response to 5GC provisioning system 425. 5GC provisioning system 425 reports the access node metric to the network operator.

In some examples, 5GC provisioning system 425 receives a request from the network operator for a UE metric for UE 401. 5GC provisioning system 425 transfers an N3IWF API call for the UE metric to 5GC N3IWF 421. 5GC N3IWF 421 receives the N3IWF API call for the UE metric and responsively transfers a UE API call for the UE metric to UE 401 over the NWu links that traverse WIFI/ENET access node 411. UE 401 receives the UE API call for the UE metric over the NWu. In response, UE 401 identifies the UE metric and transfers a UE API response indicating the UE metric to 5GC N3IWF 421 over the NWu that traverses WIFI/ENET access node 411. 5GC N3IWF 421 transfers an N3IWF API response to 5GC provisioning system 425. 5GC provisioning system 425 reports the access node metric to the network operator.

Figure 5:
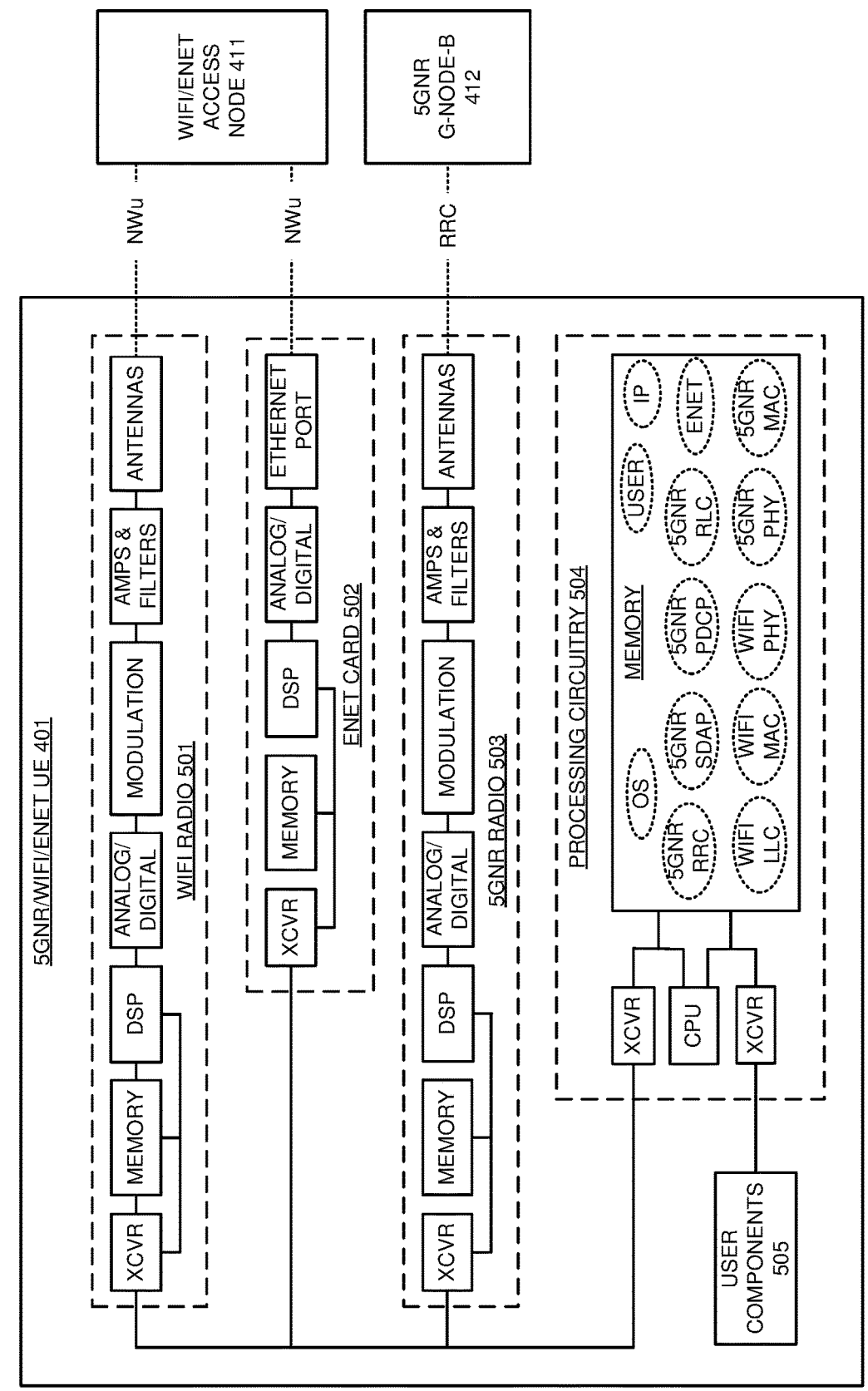
FIG. 5 illustrates a Fifth Generation New Radio (5GNR)/Institute of Electrical and Electronic Engineers (IEEE) 802.11 (WIFI)/IEEE 802.3 (ENET) UE in the 5G communication network.

FIG. 5 illustrates SGNR/WIFI/ENET UE 401 in 5G communication network 400. UE 401 comprises an example of UE 101, although UE 101 may differ from this example. UE 401 comprises WIFI radio 501, ENET card 502, SGNR radio 503, and processing circuitry 504. WIFI radio 501 and SGNR radio 503 comprise antennas, amplifiers, filters, modulation, analog-to-digital interfaces, DSP, memory, and transceivers that are coupled over bus circuitry. ENET card 502 comprises an ENET port, analog-to-digital interfaces, Digital Signal Processors (DSP), memory, and transceivers that are coupled over bus circuitry. Processing circuitry 504 comprises memory, CPU, user interfaces and components, and transceivers (XCVRs) that are coupled over bus circuitry. The memory in processing circuitry 504 stores an operating system (OS), user applications (USER), and network applications like Internet Protocol (IP), ENET, 5GNR Physical Layer (PHY), 5GNR Media Access Control (MAC), 5GNR Radio Link Control (RLC), 5GNR Packet Data Convergence Protocol (PDCP), 5GNR Service Data Adaptation Protocol (SDAP), 5GNR Radio Resource Control (RRC), WIFI PHY, WIFI MAC, and WIFI Logical Link Control (LLC). In some examples, some portions of UE 401 may be omitted, and UE 401 may be ENET/5GNR only, WIFI/5GNR only, WIFI/ENET only, 5GNR only, WIFI only, or ENET only.

The antennas in WIFI radio 501 are wirelessly coupled to WIFI/ENET access node 411 over a wireless link that supports the NWu. The ENET port in ENET card 502 is wireline coupled to WIFI/ENET access node 411 over a metal and/or glass link that supports the NWu. The antennas in 5GNR radio 503 are wirelessly coupled to 5GNR gNodeB 412 over a wireless link that supports the RRC. Transceivers in WIFI radio 501, ENET card 502, and 5GNR radio 503 are coupled to transceivers in processing circuitry 504. Transceivers in processing circuitry 504 are coupled to user components 505 like displays, controllers, and memory. The CPU in processing circuitry 504 executes the operating system, user applications, and 5GNR network applications to exchange 5GNR signaling and data with 5GNR gNodeB 412 over 5GNR radio 503. The CPU in processing circuitry 504 executes the operating system, user applications, and WIFI/ENET network applications to exchange WIFI data and ENET data with WIFI/ENET access node 411 over WIFI radio 501 and/or ENET card 502. UE 401 could also use other non-3GPP protocols like bluetooth and narrowband internet-of-things.

The 5GNR RRC in UE 401 attaches to 5GNR gNodeB 412 and establishes the RRC link. The 5GNR RRC in UE 401 registers with 5GC AMF 422 over the RRC link and N2 that traverses 5GNR gNodeB 412. The 5GNR RRC in UE 401 and 5GC AMF 422 establish an N1 over the RRC and N2 that traverses 5GNR gNodeB 412. The 5GNR network applications in UE 401 and 5GNR gNodeB 412 exchange user data over 5GNR radio 503.

The WIFI network applications in UE 401 attach to WIFI/ENET access node 411 over WIFI radio 501. The WIFI applications register with N3IWF 421 over WIFI/ENET access node 411. The WIFI applications and N3IWF 421 establish an NWu over WIFI/ENET access node 411. In a like manner, the ENET network applications in UE 401 may attach to WIFI/ENET access node 411 over ENET card 502. The ENET applications register with N3IWF 421 over the WIFI/ENET access node 411. The 5GNR RRC in UE 401 registers with 5GC AMF 422 over the NWu and N2 that traverse WIFI/ENET access node 411 and 5GC N3IWF 421. The 5GNR RRC and 5GC AMF 422 establish an N1 over the NWu and N2 that traverse WIFI/ENET access node 411 and 5GC N3IWF 421. The WIFI network applications in UE 401 and WIFI/ENET access node 411 exchange user data over WIFI radio 501.

5GC AMF 422 transfers API calls to the 5GNR RRC in UE 401 over the N1 which traverses the N2 and NWu that traverses 5GC N3IWF 421 and WIFI/ENET access node 411. 5GC AMF 422 transfers API calls to UE 401 over the N1 which traverses the N2 and RRC that traverse 5GNR gNodeB 412. The 5GNR RRC in UE 401 processes the API calls. The 5GNR RRC in UE 401 may transfer API responses to 5GC AMF 422 over either of the N1 signaling pathways. 5GC N3IWF 421 transfers API calls to the 5GNR RRC in UE 401 over the NWu which traverses WIFI/ENET access node 411. The 5GNR RRC in UE 401 may transfer API responses to 5GC N3IWF the NWu signaling pathway.

Figure 6:
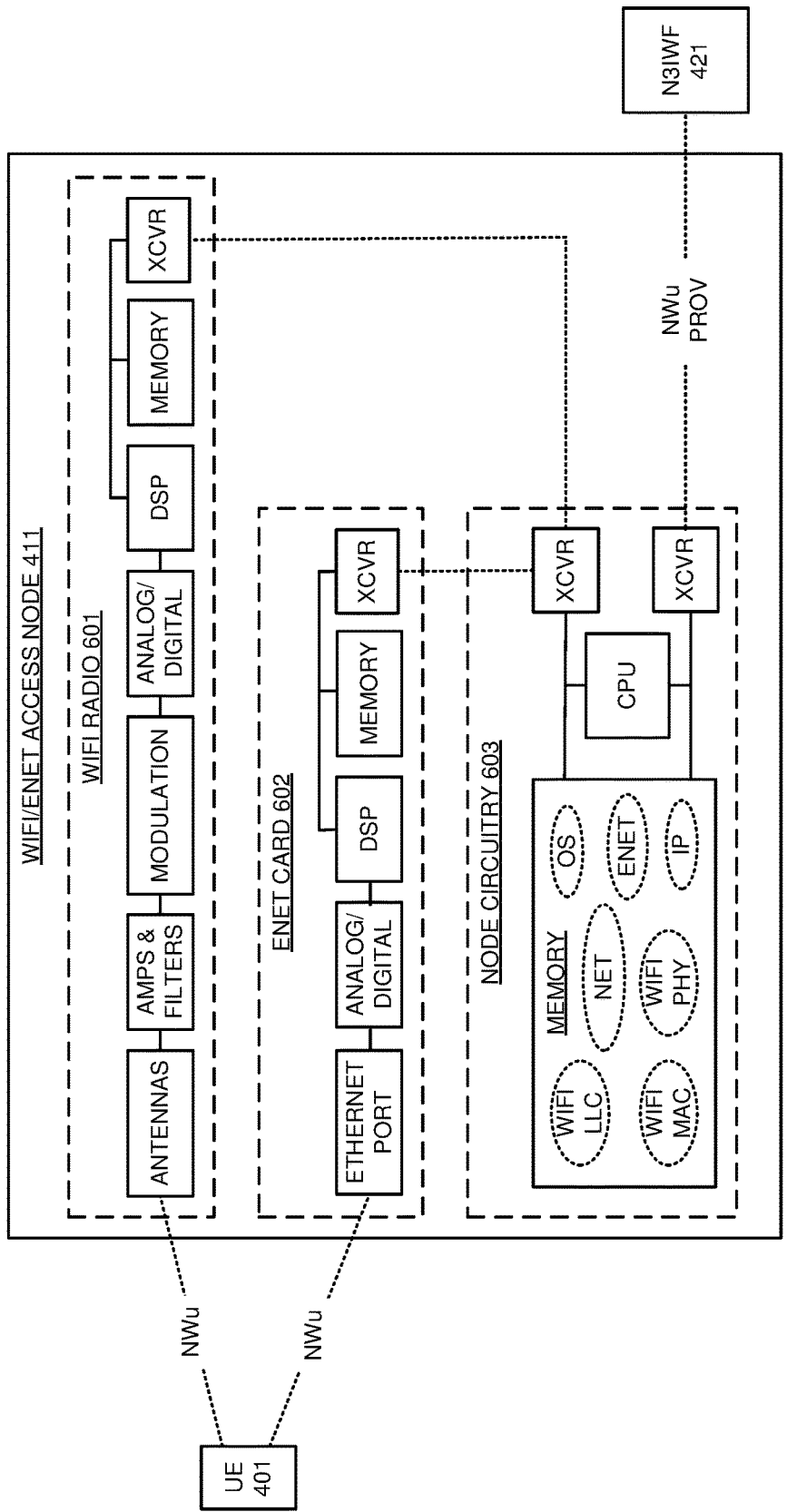
FIG. 6 illustrates a non-3GPP WIFI/ENET access node in the 5G communication network.

FIG. 6 illustrates non-3GPP WIFI/ENET access node 411 in 5G communication network 400. WIFI/ENET access node 411 comprises an example of access node 111, although access node 111 may differ from this example. WIFI/ENET access node 411 comprises WIFI radio 601, ENET card 602, and node circuitry 603. WIFI radio 601 comprises antennas, amplifiers, filters, modulation, analog-to-digital interfaces, DSP, memory, and transceivers that are coupled over bus circuitry. ENET card 602 comprises ENET ports, analog-to-digital interfaces, DSP, memory, and transceivers that are coupled over bus circuitry. Node circuitry 603 comprises memory, CPU, and transceivers that are coupled over bus circuitry. The memory in node circuitry 603 stores operating systems and network applications like WIFI PHY, WIFI MAC, WIFI LLC, ENET, IP, and 3GPP Networking (NET). In some examples, WIFI radio 601 and the WIFI network applications are omitted, and ENET card 602 and the ENET applications are used as described. In other examples, ENET card 602 and the ENET applications are omitted, and WIFI radio 601 and the WIFI network applications are used as described. Other wireless protocols like bluetooth and narrowband internet-of-things could be used.

The antennas in WIFI radio 601 are wirelessly coupled to UE 401 over wireless links that support NWu. The ENET port in ENET card 602 is wireline coupled to UE 401 over metal and/or glass links that support NWu. Transceivers in WIFI radio 601 and ENET card 602 are coupled to transceivers in node circuitry 603. Transceivers in node circuitry 603 are coupled to transceivers in N3IWF 421 over backhaul links. The CPU in node circuitry 603 executes the operating system and network applications to exchange data and signaling with UE 401 over the NWu and to exchange data and signaling with N3IWF 421 over the NWu and provisioning links.

In some examples, UE 401 attaches to the WIFI network applications in node circuitry 603 over WIFI radio 601. UE 401 registers with N3IWF 421 over WIFI radio 601 and node circuitry 603. UE 401 and N3IWF 421 establish an NWu that traverses WIFI radio 601, and node circuitry 603. UE 401 registers with 5GC AMF 422 over the over NWu and N2 that traverse WIFI radio 601, node circuitry 603, and N3IWF 421. UE 401 and 5GC AMF 422 establish the N1 which traverses the NWu and N2 that traverse WIFI radio 601, node circuitry 603, and N3IWF 421. UE 401 and the 3GPP networking application in node circuitry 603 exchange user data over the NWu that traverses WIFI radio 601 and the WIFI applications. The 3GPP networking application in node circuitry 603 and N3IWF 421 exchange the user data over the NWu.

In some examples, UE 401 attaches to the ENET applications in node circuitry 603 over ENET card 602. UE 401 registers with N3IWF 421 over ENET card 602 and node circuitry 603. UE 401 and N3IWF 421 establish an NWu that traverses ENET card 602 and node circuitry 603. UE 401 registers with 5GC AMF 422 over the over the NWu and N2 that traverse ENET card 602, node circuitry 603, and N3IWF 421. UE 401 and 5GC AMF 422 establish the N1 which traverses the NWu and N2 that traverse ENET card 602, node circuitry 603, and N3IWF 421. UE 401 and the 3GPP networking application in node circuitry 603 exchange user data over the NWu that traverses ENET card 602 and ENET applications. The 3GPP networking application in node circuitry 603 and N3IWF 421 exchange the user data over the NWu.

5GC AMF 422 exchanges API calls and API responses with the 5GNR RRC in UE 401 over the N1 which traverses the NWu and N2 that traverse N3IWF 421 and WIFI/ENET access node 411. 5GC N3IWF 421 exchanges API calls and API responses with the 5GNR RRC in UE 401 over the NWu. 5GC N3IWF 421 exchanges API calls and API responses with the NET in node circuitry 603 over the provisioning links.

Figure 7:
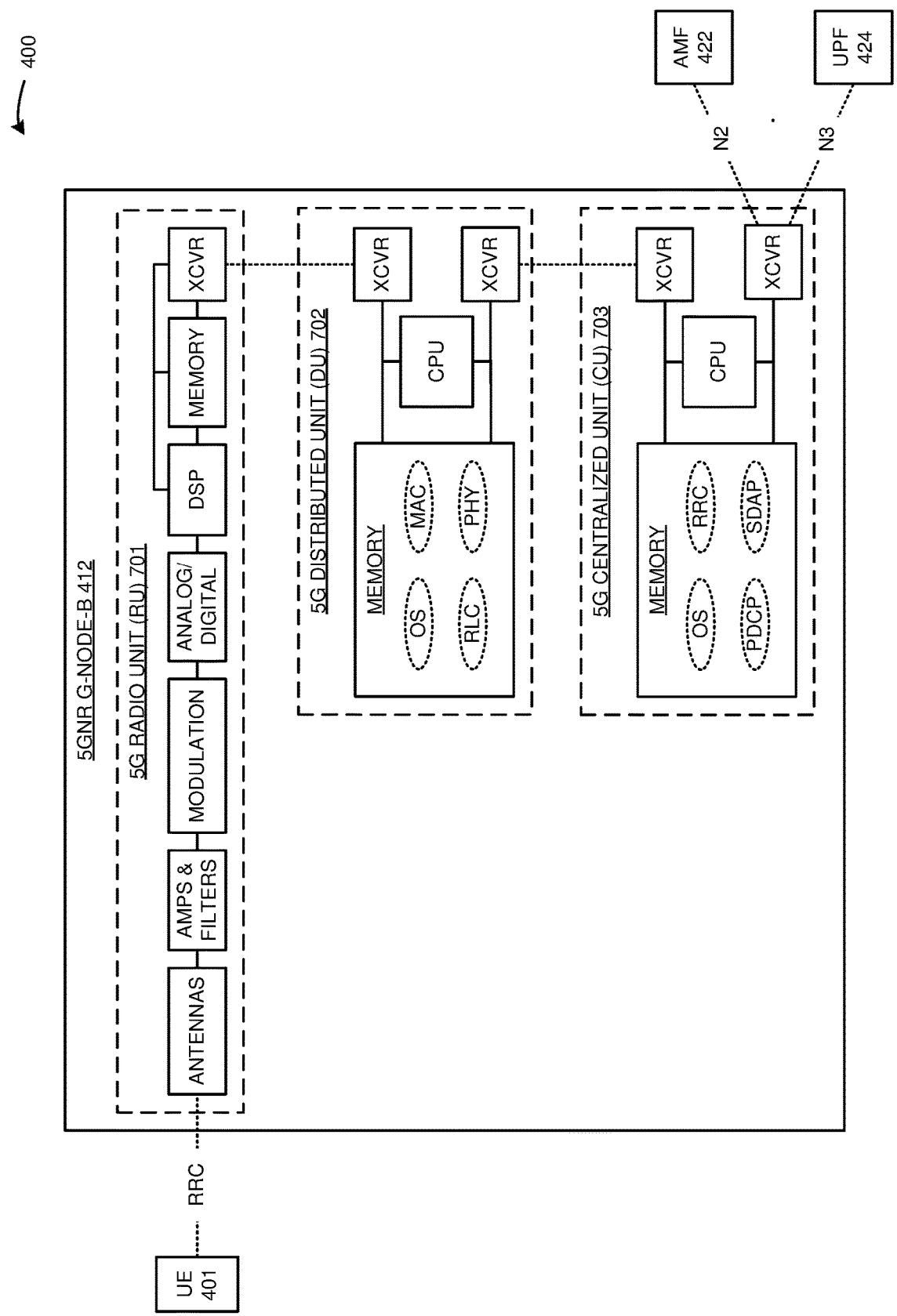
FIG. 7 illustrates a 3GPP 5GNR gNodeB in the 5G communication network.

FIG. 7 illustrates 5GNR gNodeB 412 in 5G communication network 400. 5GNR gNodeB 412 comprises an example of access node 111, although access node 111 may differ from this example. 5GNR gNodeB 412 comprises 5G Radio Unit (RU) 701, 5G Distributed Unit (DU) 702, and 5G Centralized Unit (CU) 703. RU 701 comprises antennas, amplifiers, filters, modulation, analog-to-digital interfaces, DSP, memory, and transceivers that are coupled over bus circuitry. DU 702 comprises memory, CPU, and transceivers that are coupled over bus circuitry. The memory in DU 702 stores operating systems and 5GNR network applications like PHY, MAC, and RLC. CU 703 comprises memory, CPU, and transceivers that are coupled over bus circuitry. The memory in CU 703 stores an operating system and 5GNR network applications like Packet Data Convergence Protocol (PDCP), Service Data Adaptation Protocol (SDAP), and Radio Resource Control (RRC).

The antennas in RU 701 are wirelessly coupled to UE 401 over 5GNR links that support RRC and N1. Transceivers in RU 701 are coupled to transceivers in DU 702 over fronthaul links like enhanced Common Public Radio Interface (eC-PRI). Transceivers in DU 702 are coupled to transceivers in CU 703 over mid-haul links. Transceivers in CU 703 are coupled to 5GC AMF 422 and 5GC UPF 424 over backhaul links. The CPU in DU 703 executes an operating system, PHY, MAC, and RLC to exchange 5GNR data units with RU 701 and to exchange 5GNR data units with CU 703. The CPU in CU 703 executes an operating system, PDCP, SDAP, and RRC to exchange 5GC N2/N1 signaling and N3 data with 5GC AMF 422 and 5GC UPF 424.

UE 401 attaches to the 5GNR RRC in CU 703 and establishes the RRC link. UE 401 registers with 5GC AMF 422 over the RRC link and N2 that traverse the RRC in CU 703. UE 401 and 5GC AMF 422 establish the N1 which traverses the RRC link and N2 that traverse the RRC in CU 703. 5GC AMF 422 signals the RRC in CU 703 over the N2 to serve UE 401 over an N3 between the SDAP in CU 703 and 5GC UPF 424. UE 401 and the SDAP in CU 703 exchange user data over the RRC link. The SDAP in CU 703 and 5GC UPF 424 exchange the user data over the N3.

5GC AMF 422 exchanges API calls and API responses with the 5GNR RRC in UE 401 over the N1 which traverses the RRC link and N2 that traverse 5GNR gNodeB 412. 5GC AMF 422 exchanges API calls and API responses with the 5GNR RRC in 5GNR gNodeB over the N2.

Figure 8:
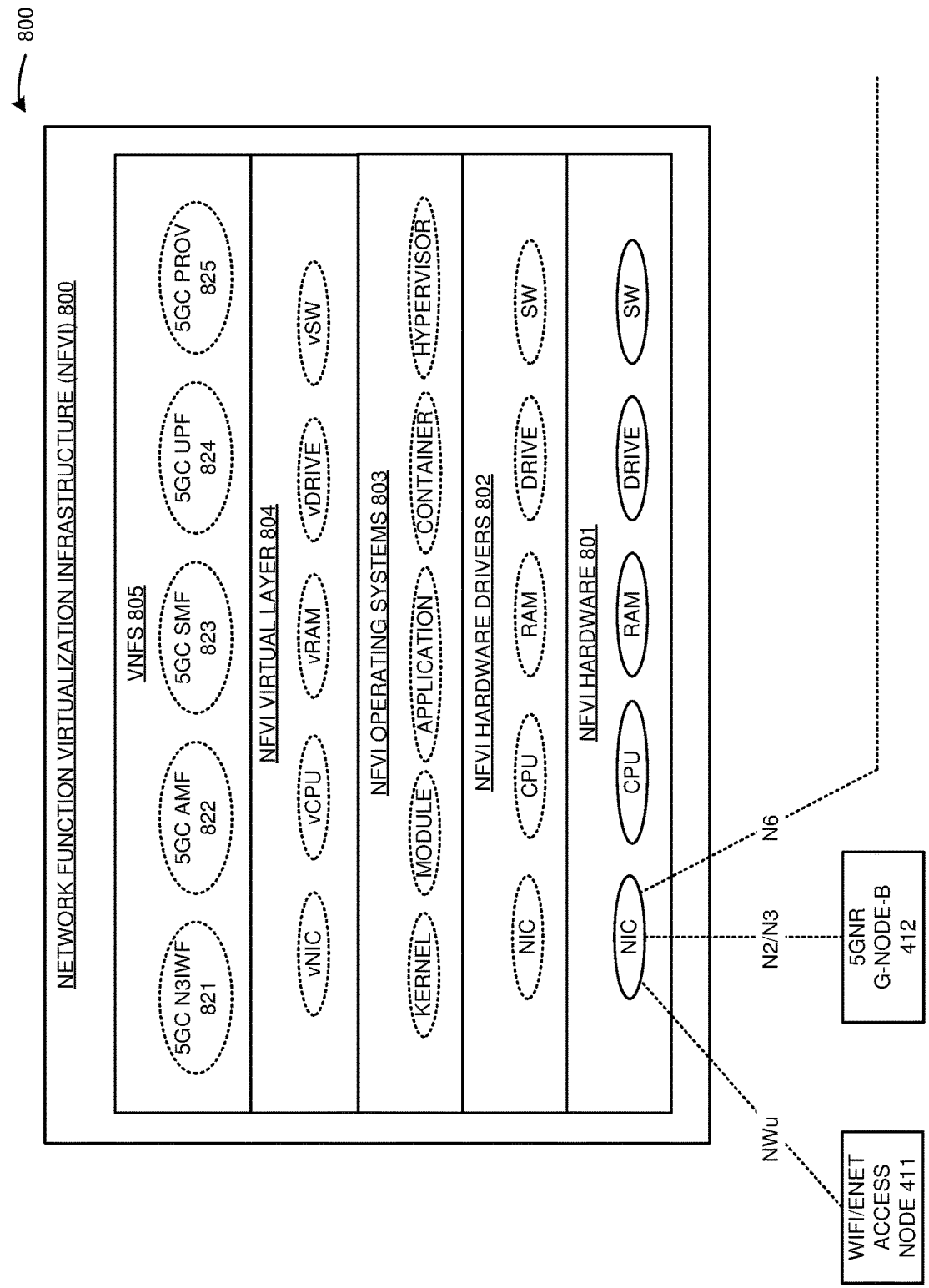
FIG. 8 illustrates a Network Function Virtualization Infrastructure (NFVI) in the 5G communication network.

FIG. 8 illustrates Network Function Virtualization Infrastructure (NFVI) 800 in 5G communication network 400. NFVI 800 comprises an example of network functions 121-124, although functions 121-124 may vary from this example. Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise N3IWF 821, 5GC AMF 822, 5GC SMF 823, 5GC UPF 824, and 5GC provisioning system 825. Other VNFs like Authentication Server Function (AUSF) and Network Repository Function (NRF) are typically present but are omitted for clarity. NFVI 800 may be located at a single site or be distributed across multiple geographic locations. The NIC in NFVI hardware 801 are coupled to WIFI/ENET access node 411, 5GNR gNodeB 412, and external systems. NFVI hardware 801 executes NFVI hardware drivers 802, NFVI operating systems 803, NFVI virtual layer 804, and NFVI VNFs 805 to form 3GPP IWF 421, 5GC AMF 422, 5GC SMF 423, 5GC UPF 424, and 5GC provisioning system 425 which serve UE 401.

Figure 9:
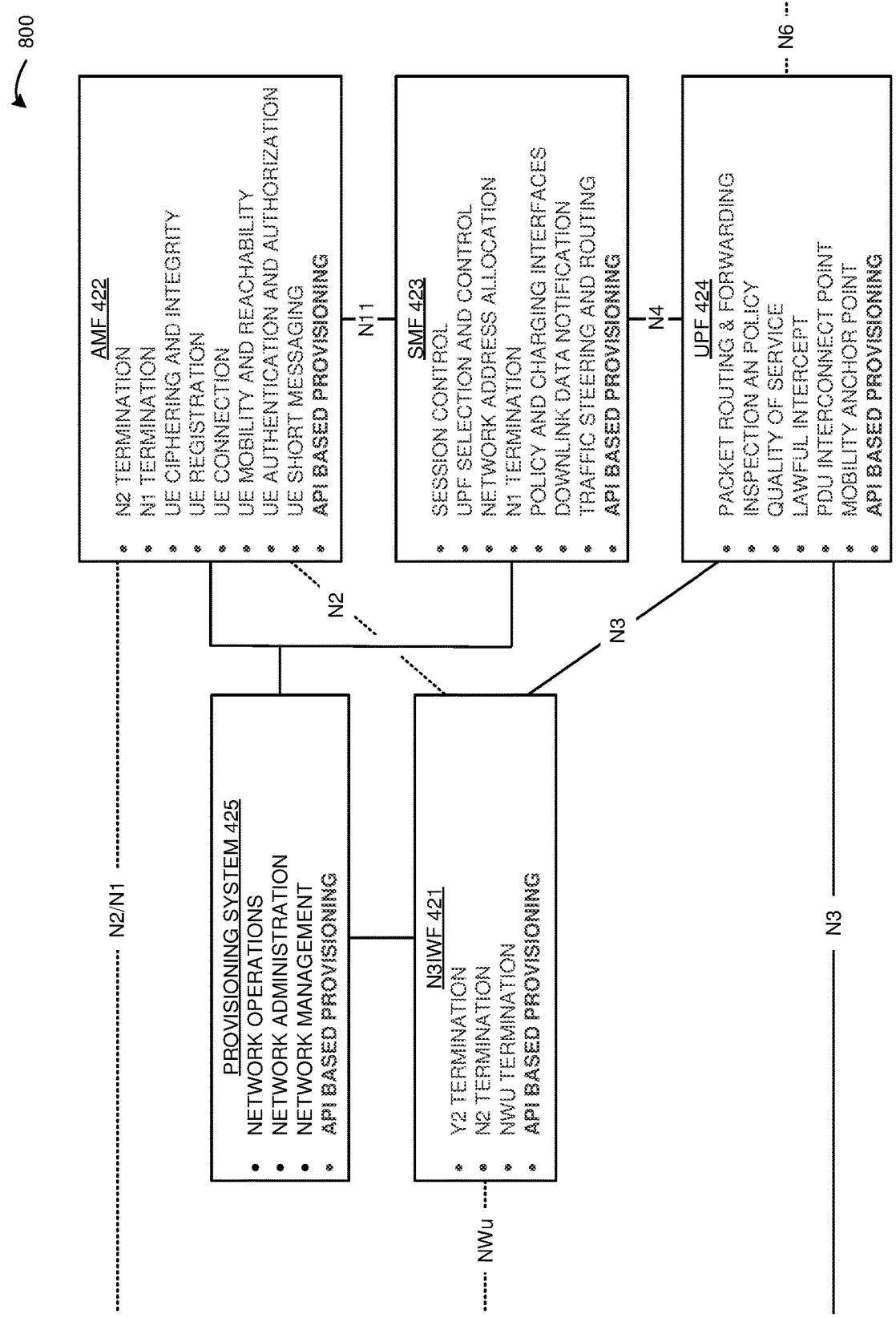
FIG. 9 further illustrates the NFVI in the 5G communication network.

FIG. 9 further illustrates Network Function Virtualization Infrastructure (NFVI) 800 in 5G communication network 400. 5GC N3IWF 421 performs Y2 termination, N2 termination, NWu termination, and API based provisioning. 5GC AMP 422 performs N2. termination, N1 termination, UE ciphering & integrity protection, UE registration and connection, UE connection/mobility management. UE authentication and authorization, UE short messaging, and API based provisioning. 5GC SMF 423 performs session establishment and management, network address allocation, N1 termination, downlink data notification, traffic steering and routing, and API based provisioning. 5GC UPF 424 performs packet routing & forwarding, packet inspection, QoS handling, PDU interconnection, mobility anchoring, and API based provisioning. 5GC provisioning system 425 performs network operations, network administration, network management, and API based provisioning.

The WIFI/ENET applications in UE 401 attach to WIFI/ENET access node 411. The WIFI/ENET applications in UE 401 register with N3IWF 421 over WIFI/ENET access node 411. The WIFI/ENET applications in UE 401 and N3IWF 421 establish an NWu that traverses WIFI/ENET access node 411. The RRC in UE 401 registers with 5GC AMF 422 over the NWu and N2 that traverse WIFI/ENET access node 411 and N3IWF 421. The RRC in UE 401 and 5GC AMF 422 establish an N1 over the NWu, WIFI/ENET access node 411, N3IWF 421, and N2. 5GC AMF 422 signals N3IWF 421 over the N2 to serve UE 401 over the N3 between N3IWF 421 and 5GC UPF 424. 5GC AMF 422 signals 5GC SMF 423 over the N11 to serve UE 401 over the N3 between N3IWF 421 and 5GC UPF 424. 5GC SMF 423 signals 5GC UPF 424 over the N4 to serve UE 401 over the N6 and over the N3 between N3IWF 421 and 5GC UPF 424.

The RRC in UE 401 also attaches to the RRC in 5GNR gNodeB 412 and establishes a RRC link with 5GNR gNodeB 412. The RRC in UE 401 registers with 5GC AMF 422 over the RRC link and N2 that traverse 5GNR gNodeB 412. The RRC in UE 401 and 5GC AMF 422 establish an N1 which traverses the RRC link and N2 that traverse 5GNR gNodeB 412. 5GC AMF 422 signals 5GNR gNodeB 412 over the N2 to serve UE 401 over an N3 between 5GNR gNodeB 412 and UPF 424. 5GC AMF 422 signals 5GC SMF 423 over the N11 to serve UE 401 over the N3 between 5GNR gNodeB 412 and 5GC UPF 424. 5GC SMF 423 signals 5GC UPF 424 over the N4 to serve UE 401 over the N3 between 5GNR gNodeB 412 and 5GC UPF 424.

In this example, 5GC provisioning system 425 receives a request from a network operator for UPF telemetry for 5GC UPF 424. 5GC provisioning system 425 transfers an SMF API call for the UPF in-band telemetry to 5GC SMF 423. 5GC SMF 423 receives the SMF API call for the UPF in-band telemetry and responsively transfers a UPF API call for the UPF in-band telemetry to 5GC UPF 424 over the N4. 5GC UPF 424 receives the UPF API call and responsively identifies its in-band telemetry. 5GC UPF 424 transfers a UPF API response that indicates its telemetry to 5GC SMF 423 over the N4. 5GC SMF 423 transfers an SMF API response that indicates the UPF in-band telemetry to provisioning system 425. 5GC provisioning system 425 receives the SMF API response and reports the UPF in-band telemetry to the network operator.

5GC provisioning system 425 receives a request from the network operator for UE capabilities for UE 401. 5GC provisioning system 425 transfers an AMF API call for the UE capabilities to 5GC AMF 422. 5GC SMF 423 receives the AMF API call for the UE capabilities and responsively transfers a UE API call for the UE metric to the RRC in UE 401 over the N1 which traverses the RRC link and N2 that traverse 5GNR gNodeB 412. The RRC in UE 401 receives the UE API call for its UE capabilities over the N1. In response, the RRC in UE 401 identifies its UE capabilities and transfers a UE API response indicates UE capabilities to 5GC AMF 422 over the N1 which traverses the RRC link and N2 that traverse 5GNR gNodeB 412. 5GC AMF 422 receives the UE API response and transfers an AMF API response to 5GC provisioning system 425. Provisioning system 425 reports the UE capabilities to the network operator.

5GC provisioning system 425 receives a request from the network operator for the access node load for WIFI/ENET access node 411. 5GC provisioning system 425 transfers an N3IWF API call for the access node load to 5GC N3IWF 421. 5GC N3IWF 421 receives the N3IWF API call for the access node load. 5GC N3IWF responsively transfers an access node API call for the access node load over provisioning links to the NET in WIFE/ENET access node 411. The NET in WIFI/ENET access node 411 receives the access node API call for the access node load over the provisioning links. In response, the NET in WIFE/ENET access node 411 identifies its load and transfers an access node API response indicating its load to 5GC N3IWF 421 over the provisioning links. 5GC N3IWF 421 receives the access node API response transfers an N3IWF API response to 5GC provisioning system 425 that indicates the access node load. Provisioning system 425 reports the access node load to the network operator. In other examples, 5GC provisioning system 425 transfers other API calls to the control plane functions to retrieve metrics from the user elements.

Figure 10:
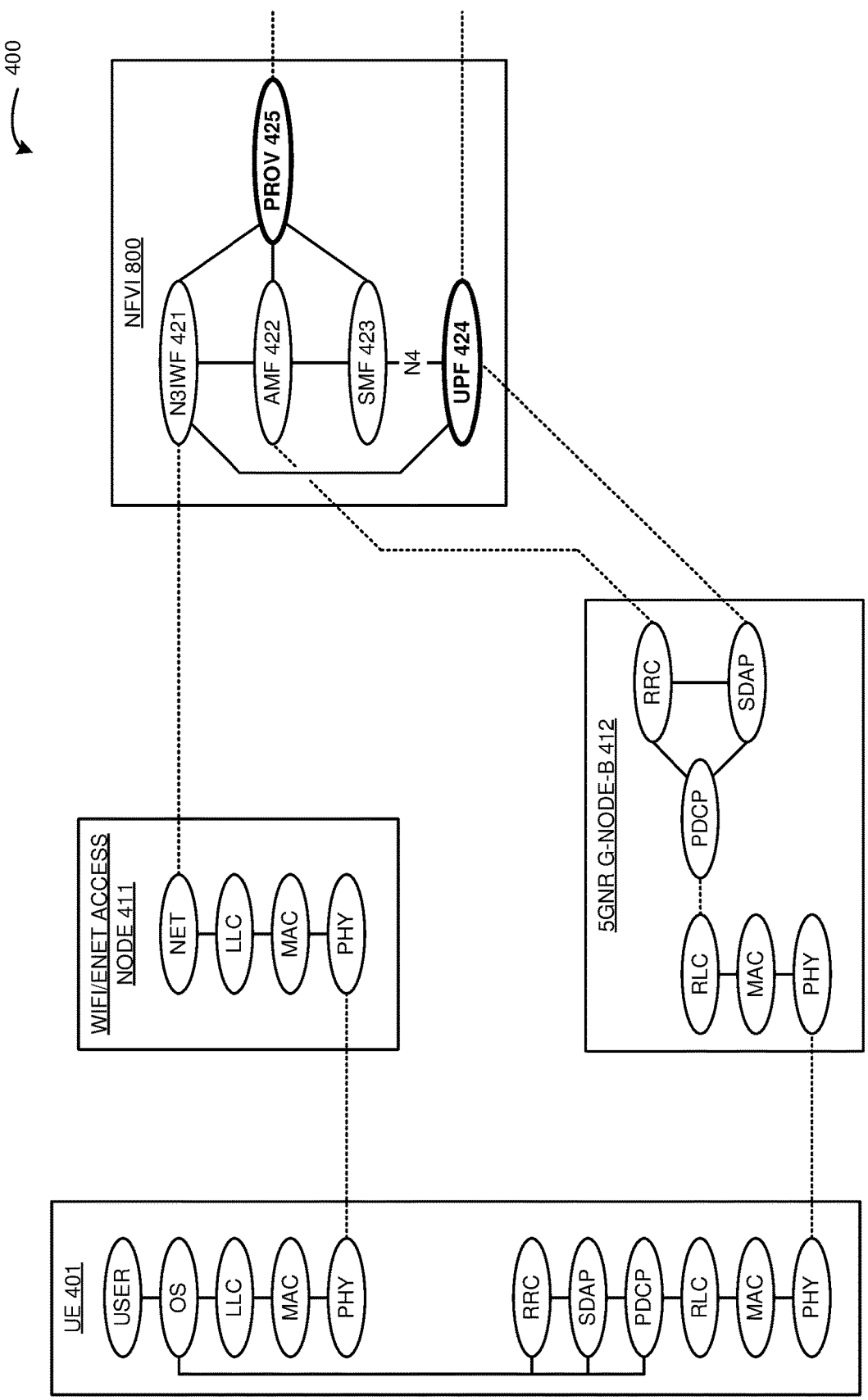
FIG. 10 illustrates an exemplary operation of the 5G communication network to provision a User Plane Function (UPF) over N4 signaling links.

FIG. 10 illustrates an exemplary operation of 5G communication network 400 to provision UPF 424 over 3GPP N4 links. The operation may vary in other examples. Provisioning system 425 receives a request from a network operator for a UPF metric for 5GC UPF 424 and transfers an SMF API call for the UPF metric to 5GC SMF 423. 5GC SMF 423 receives the SMF API call for the UPF metric and responsively transfers a UPF API call for the UPF metric to 5GC UPF 424 over the N4. 5GC UPF 424 receives the UPF API call and responsively identifies the UPF metric. 5GC UPF 424 transfers a UPF API response that indicates the UPF metric to 5GC SMF 423 over the N4. 5GC SMF 423 transfers an SMF API response that indicates the UPF metric to provisioning system 425. Provisioning system 425 receives the SMF API response and reports the UPF metric to the network operator.

Figure 11:
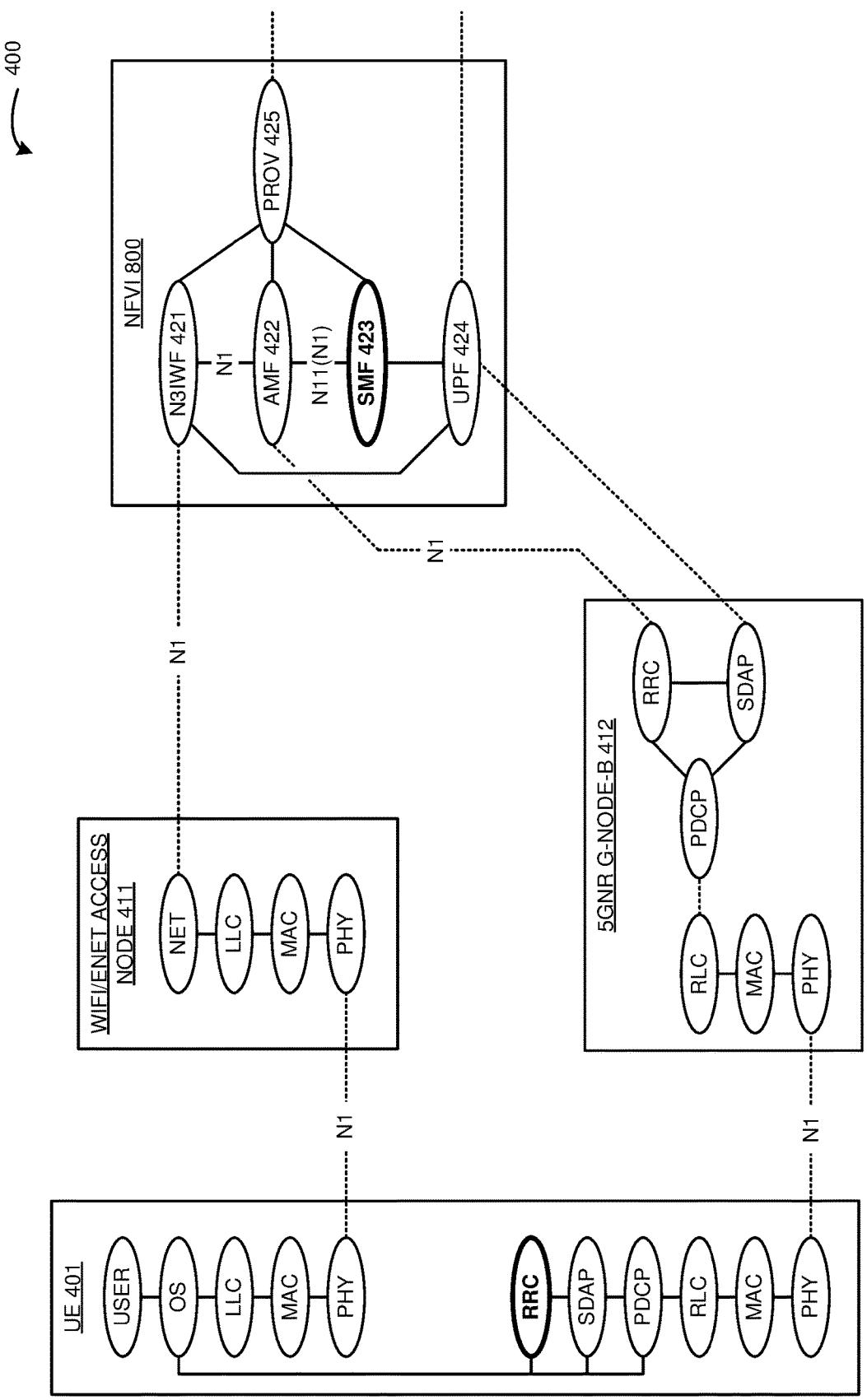
FIG. 11 illustrates an exemplary operation of the 5G communication network to provision the 5GNR/WIFI/Ethernet UE over N1 signaling links.

FIG. 11 illustrates an exemplary operation of 5G communication network 400 to provision UE 410 over 3GPP N1 links. The operation may vary in other examples. Provisioning system 425 receives a request from a network operator for a UE metric for UE 401. Provisioning system 425 transfers an SMF API call for the UE metric to 5GC SMF 423. 5GC SMF 423 receives the SMF API call for the UE metric and responsively transfers a UE API call for the UE metric in N1 signaling to 5GC AMF 422 over the N11. 5GC AMF 422 receives the UE API call in N1 signaling and responsively transfers the UE API call to the NET in WIFI/ENET access node 411 over N3IWF 421 and the N1. In some examples, 5GC AMF 422 may instead transfer the UE API call to the RRC in UE 401 over the N1 that traverses SGNR gNodeB 412. The NET in WIFI/ENET access node 411 transfers the UE API call to the RRC in UE 401 over the LLCs, MACs, PHYs, and N1. In response, the RRC in UE 401 identifies the UE metric and transfers a UE API response indicating the UE metric to the NET in WIFI/ENET access node 411 over the LLCs, MACs, PHYs, and N1. The NET in WIFI/ENET access node 411 transfers the UE API response to 5GC AMF 422 over the N1 and N3IWF 421. AMF 422 forwards the UE API response in N1 signaling to 5GC SMF 423 over the N11. 5GC SMF 423 transfers an SMF API response to 5GC provisioning system 425. 5GC provisioning system 425 reports the UE metric to the network operator.

Figure 12:
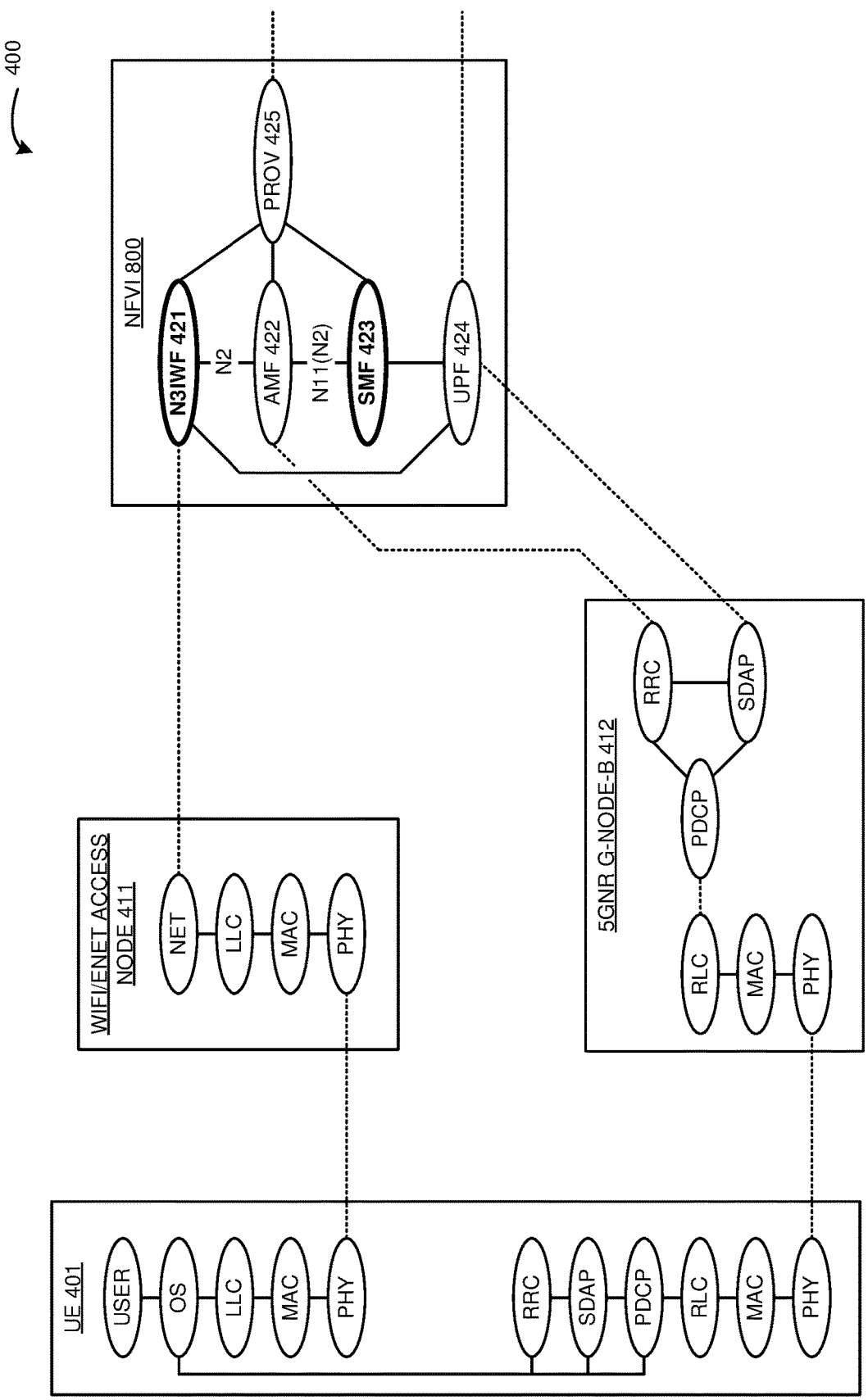
FIG. 12 illustrates an exemplary operation of the 5G communication network to provision a Non-3GPP Interworking Function (N3IWF) over N2 signaling links.

FIG. 12 illustrates an exemplary operation of 5G communication network 400 to provision 5GC N3IWF 421 over N2 links. The operation may vary in other examples. Provisioning system 425 receives a request from a network operator for a N3IWF metric for 5GC N3IWF 421. Provisioning system 425 transfers an SMF API call for the N3IWF metric to 5GC SMF 423. 5GC SMF 423 receives the SMF API call for the N3IWF metric and responsively transfers a N3IWF API call for the N3IWF metric in N2signaling to 5GC AMF 422 over the N11. 5GC AMF 422 forwards the N3IWF API call over the N2 to 5GC N3IWF 421. In response, 5GC N3IWF 421 identifies the N3IWF metric and transfers a N3IWF API response indicating the N3IWF metric to 5GC AMF 422 over the N2. 5GC AMF 422 forwards the N3IWF API response in N2 signaling to 5GC SMF 423 over the N11. 5GC SMF 423 transfers an SMF API response to 5GC provisioning system 425. Provisioning system 425 reports the N3IWF metric to the network operator.

Figure 13:
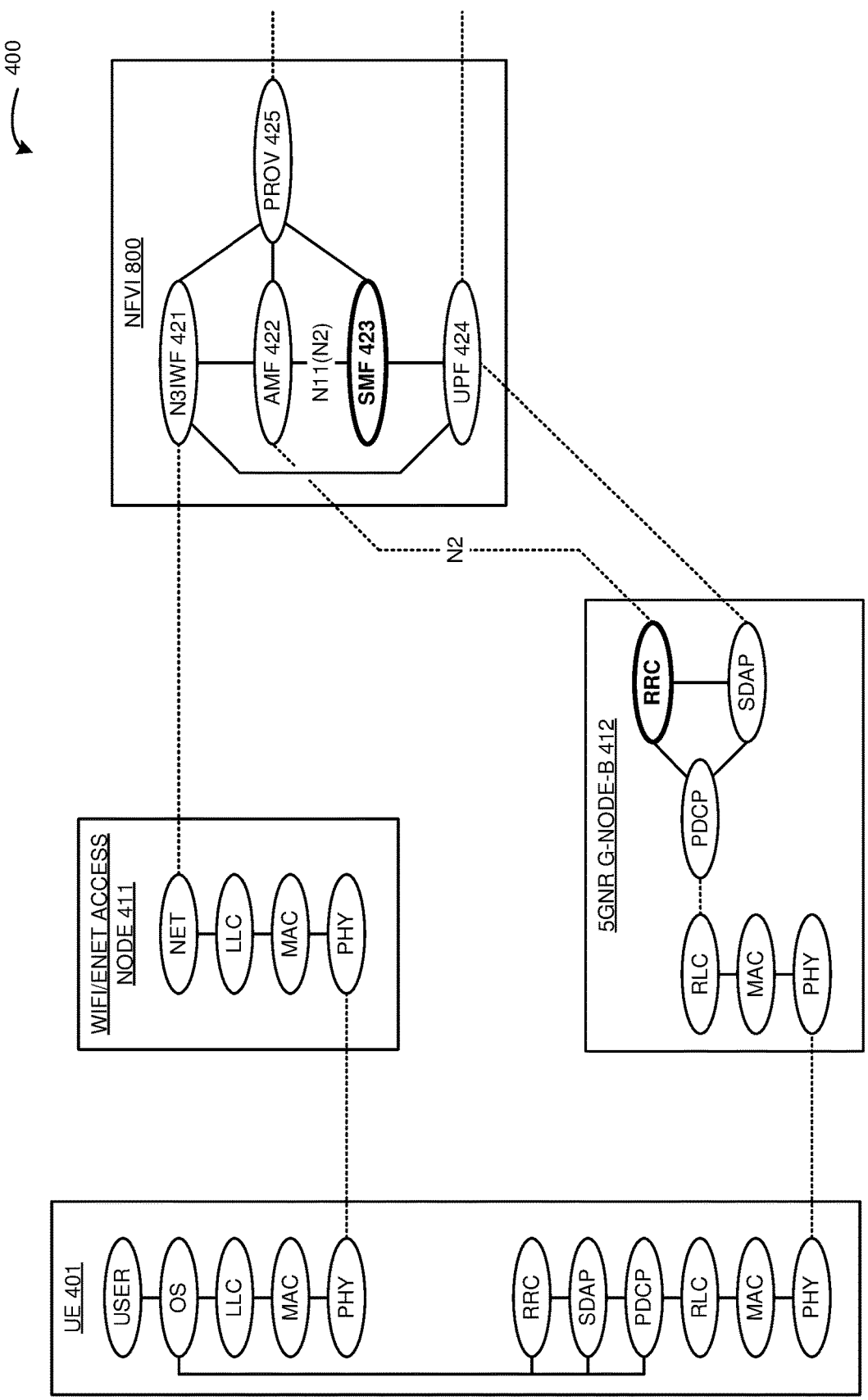
FIG. 13 illustrates an exemplary operation of the 5G communication network to provision a 5GNR gNodeB over N2 signaling links.

FIG. 13 illustrates an exemplary operation of 5G communication network 400 to provision SGNR gNodeB 412 over N2 3GPP links. The operation may vary in other examples. Provisioning system 425 receives a request from the network operator for an access node metric for SGNR gNodeB 412. Provisioning system 425 transfers an SMF API call for the access node metric to 5GC SMF 423. 5GC SMF 423 receives the SMF API call for the access node metric and responsively transfers an access node API call for the access node metric in N2 signaling to 5GC AMF 422 over the N11. 5GC AMF 422 receives the access node API call in N2 signaling and responsively forwards the access node API call to the RRC in SGNR gNodeB over the N2. The RRC in SGNR gNodeB 412 receives the access node API call for the access node metric over the N2 and in response, identifies the access node metric. The RRC in SGNR gNodeB 422 transfers an access node API response indicating the access node metric to 5GC AMF 422 over the N2. 5GC AMF 422 receives the access node API response and forwards the access node API response in N2 signaling to 5GC SMF 423 over the N11. 5GC SMF 423 transfers an SMF API response to 5GC provisioning system 425. Provisioning system 425 reports the access node metric to the network operator.

Figure 14:
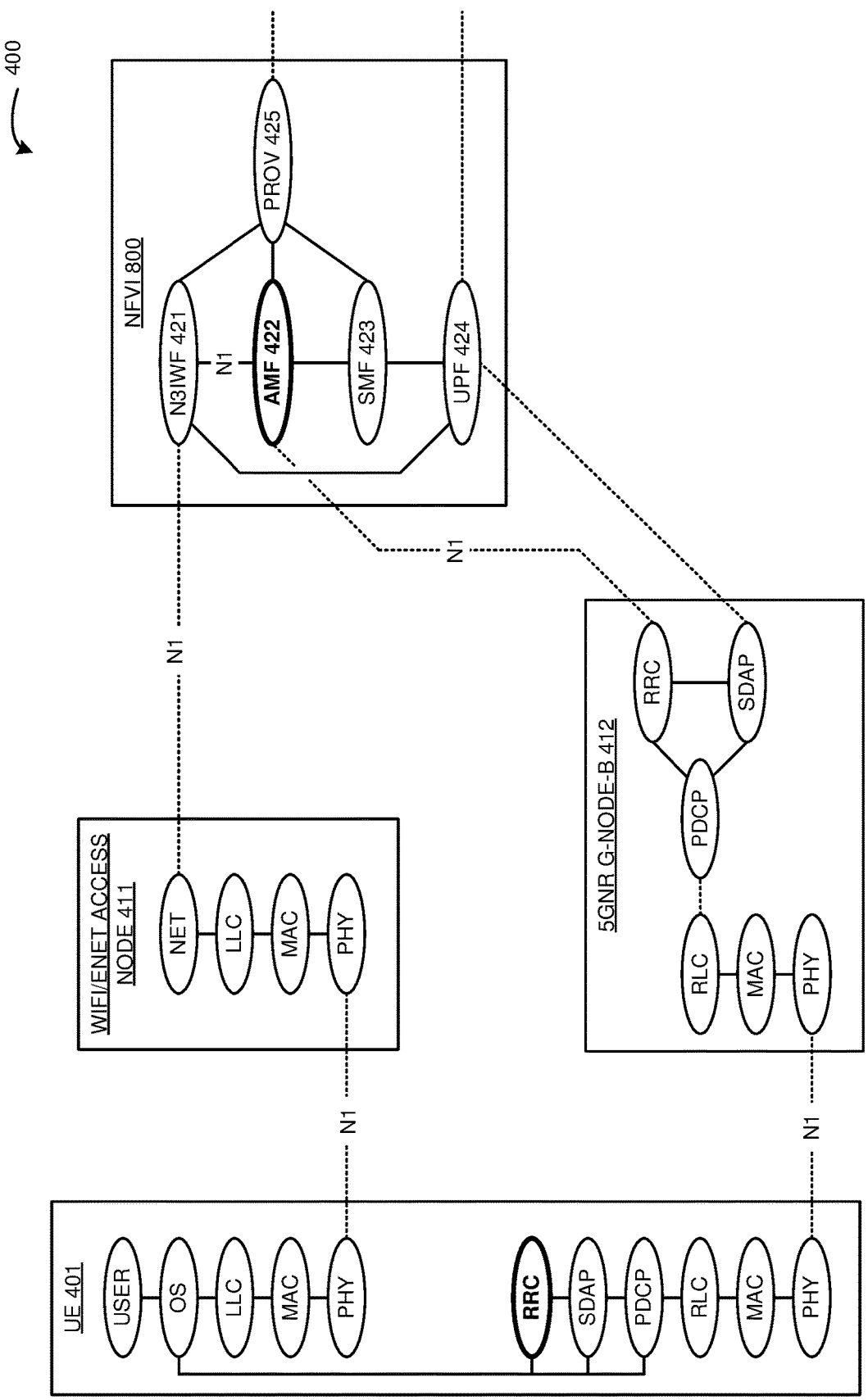
FIG. 14 illustrates an exemplary operation of the 5G communication network to provision the 5GNR/WIFI/ENET UE over N1 signaling links.

FIG. 14 illustrates an exemplary operation of 5G communication network 400 to provision UE 401 over N1 links. The operation may vary in other examples. Provisioning system 425 receives a request from a network operator for a UE metric for UE 401. Provisioning system 425 transfers an AMF API call for the UE metric to 5GC AMF 422. 5GC AMF 422 receives the AMF API call for the UE metric and responsively transfers a UE API call for the UE metric to the RRC in SGNR gNodeB 412 over the N1. In some examples, 5GC AMF 422 may instead transfer the UE API call to the RRC in UE 401 over the N1 that traverses WIFI/NET access node 411 and N3IWF 421. The RRC in SGNR gNodeB 412 transfers the UE API call to the RRC in UE 401 over the PDCPs, RLCs, MACs, PHYs and N1. In response, the RRC in UE 401 identifies the UE metric and transfers a UE API response indicating the UE metric to the RRC in SGNR gNodeB 412 over the PHYs, MACs, RLCs, PDCPs, and N1. The RRC in SGNR gNodeB 412 transfers the UE API response to 5GC AMF 422 over the N1. AMF 422 transfers an AMF API response to 5GC provisioning system 425. Provisioning system 425 reports the UE metric to the network operator.

Figure 15:
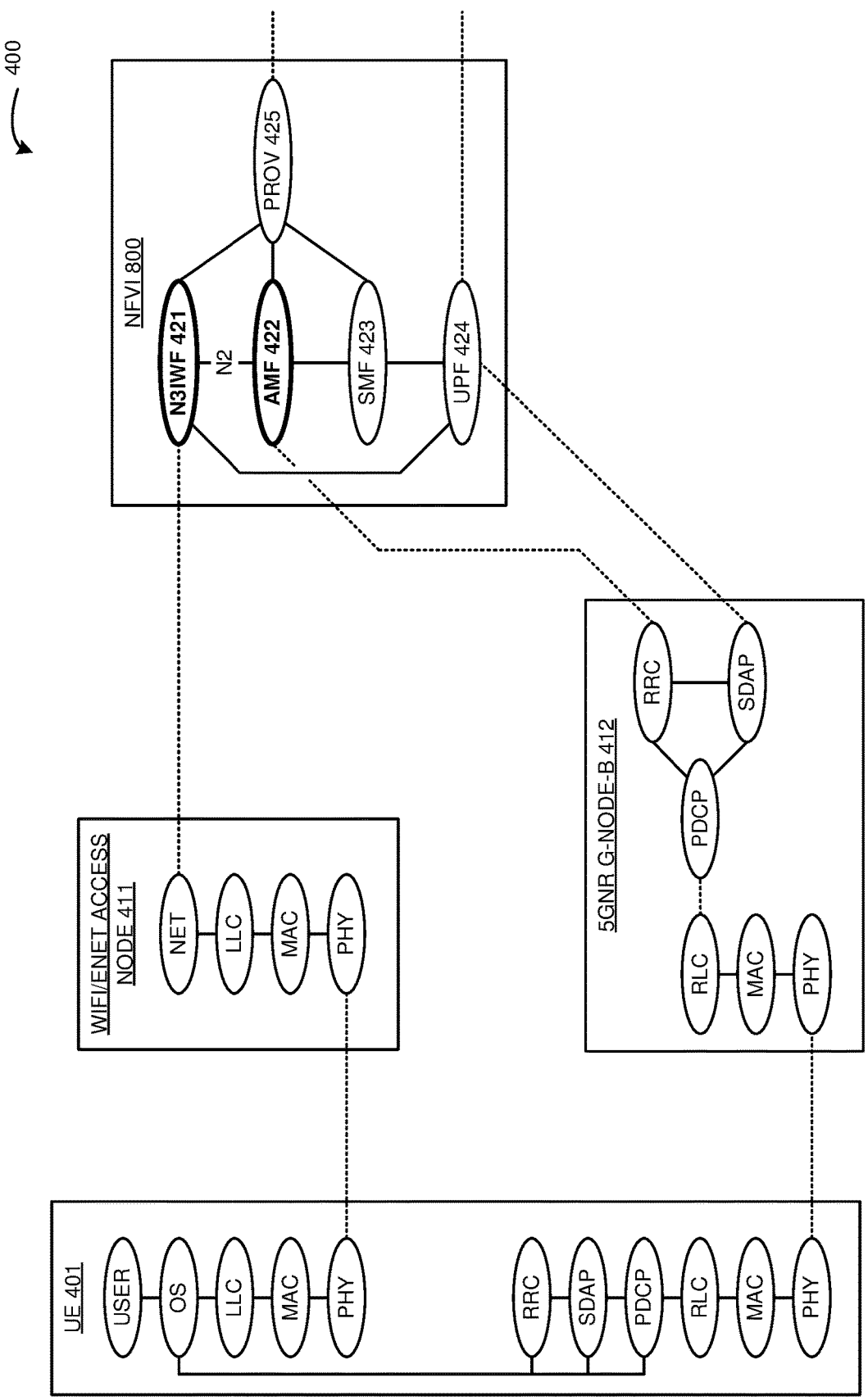
FIG. 15 illustrates an exemplary operation of the 5G communication network to provision the N3IWF over N2 signaling links.

FIG. 15 illustrates an exemplary operation of 5G communication network 400 to provision 5GC N3IWF over N2 links. The operation may vary in other examples. Provisioning system 425 receives a request from a network operator for an N3IWF metric for 5GC N3IWF 421. 5GC provisioning system 425 transfers an AMF API call for the N3IWF metric to 5GC AMF 422. 5GC AMF 422 receives the AMF API call for the N3IWF metric and responsively transfers a N3IWF API call for the N3IWF metric to 5GC N3IWF 421 over the N2. In response, 5GC N3IWF 421 identifies the N3IWF metric and transfers a N3IWF API response indicating the N3IWF metric to 5GC AMF 422 over the N2. 5GC SMF 423 transfers an AMF API response to 5GC provisioning system 425. Provisioning system 425 reports the N3IWF metric to the network operator.

Figure 16:
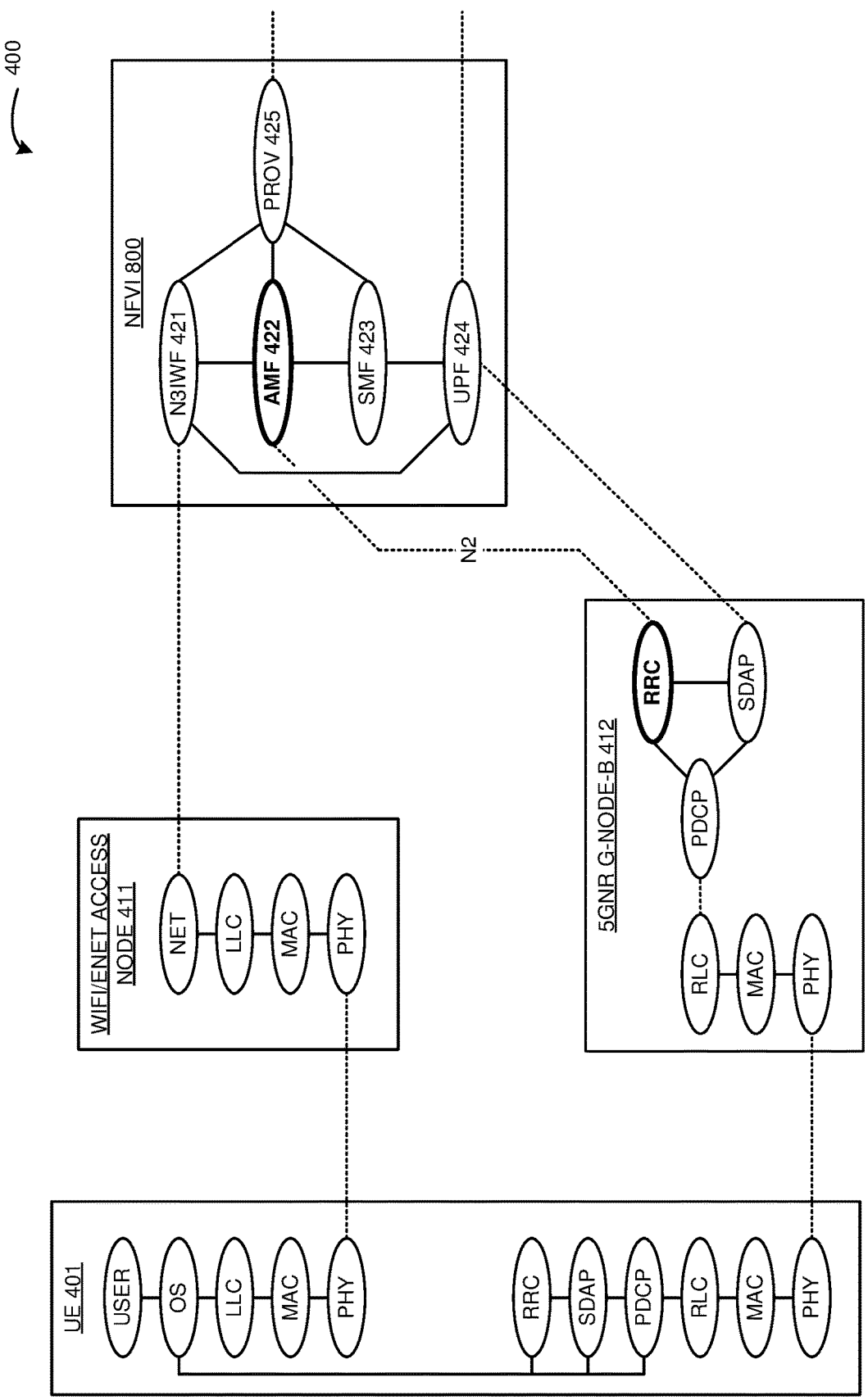
FIG. 16 illustrates an exemplary operation of the 5G communication network to provision the 5GNR gNodeB over N2 signaling links.

FIG. 16 illustrates an exemplary operation of 5G communication network 400 to provision 5GNR gNodeB 412 over N2 links. The operation may vary in other examples. Provisioning system 425 receives a request from the network operator for an access node metric for 5GNR gNodeB 412. Provisioning system 425 transfers an AMF API call for the access node metric to 5GC AMF 422. 5GC AMF 422 receives the AMF API call for the access node metric and responsively transfers an access node API call for the access node metric to the RRC in 5GNR gNodeB over the N2. The RRC in 5GNR gNodeB 412 receives the access node API call for the access node metric over the N2 and in response, identifies the access node metric. The RRC in 5GNR gNodeB 422 transfers an access node API response indicating the access node metric to 5GC AMF 422 over the N2. 5GC AMF 422 transfers an AMF API response to 5GC provisioning system 425. Provisioning system 425 reports the access node metric to the network operator.

Figure 17:
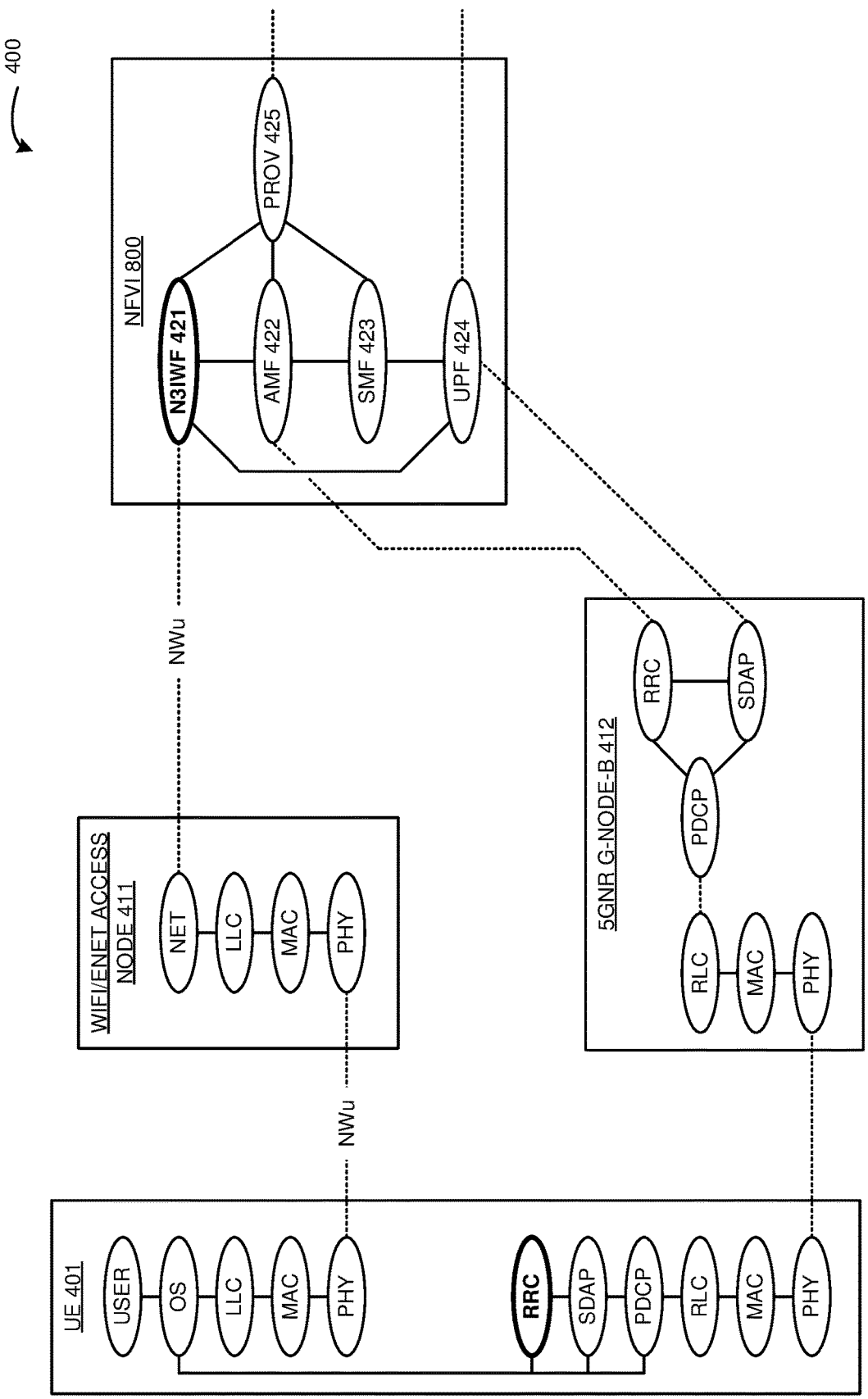
FIG. 17 illustrates an exemplary operation of the 5G communication network to provision the 5GNR/WIFI/ENET UE over NWu signaling links.

FIG. 17 illustrates an exemplary operation of 5G communication network 400 to provision UE 401 over NWu links. The operation may vary in other examples. Provisioning system 425 receives a request from a network operator for a UE metric for UE 401. Provisioning system 425 transfers an N3IWF API call for the UE metric to 5GC N3IWF 421. 5GC N3IWF 421 receives the N3IWF API call for the UE metric and responsively transfers a UE API call for the UE metric to the NET in WIFI/ENET access node 411 over the NWu. The NET in WIFI/ENET access node 411 transfers the UE API call to the RRC in UE 401 over the LLCs, MACs, PHYs, and NWu. In response, the RRC in UE 401 identifies the UE metric and transfers a UE API response indicating the UE metric to the NET in WIFI/LTE access node 411 over the LLCs, MACs, PHYs, and N1. The NET in WIFI/ENET access node 411 transfers the UE API response to 5GC AMF 422 over the N1. AMF 422 transfers an AMF API response to 5GC provisioning system 425. Provisioning system 425 reports the UE metric to the network operator.

Figure 18:
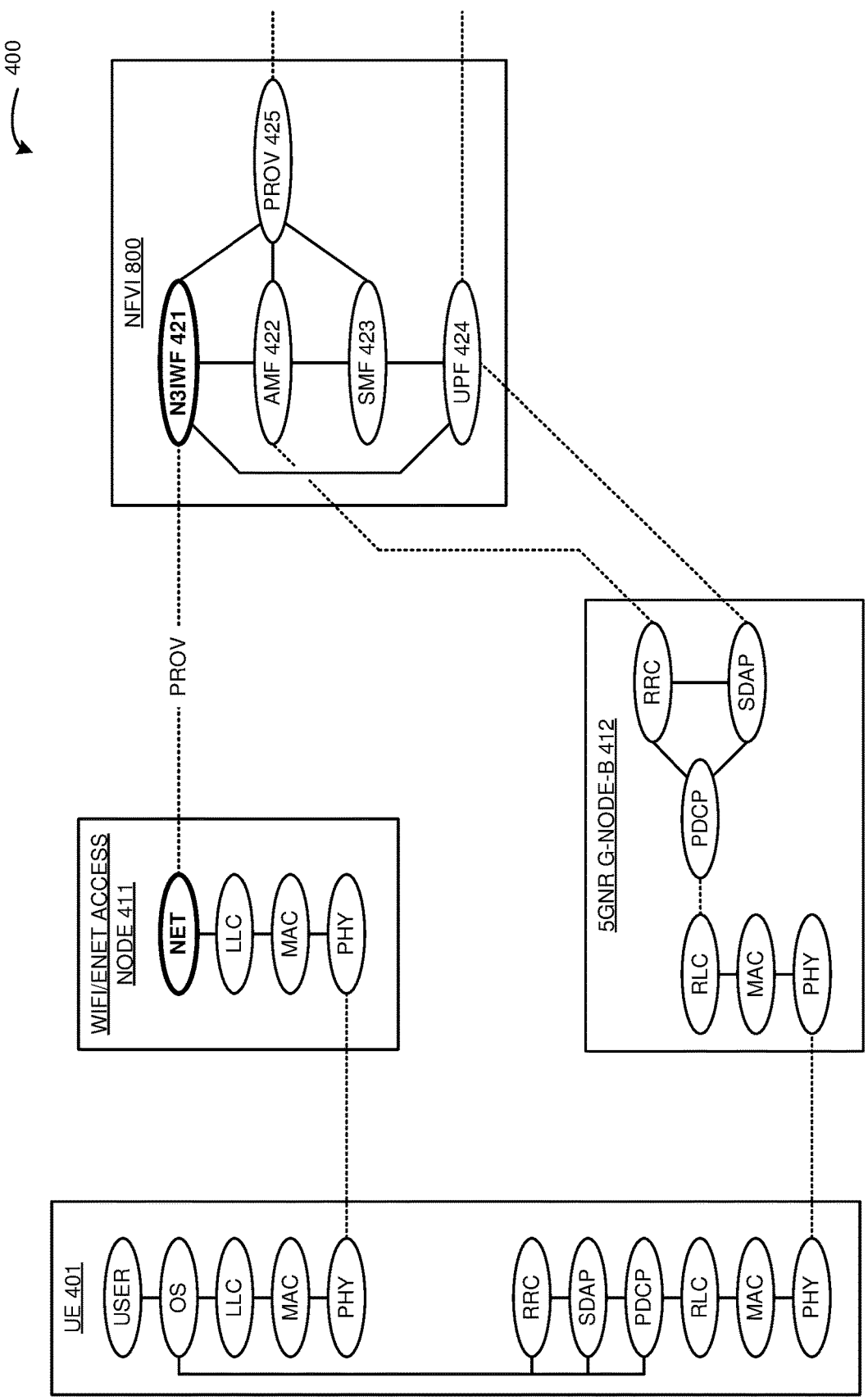
FIG. 18 illustrates an exemplary operation of the 5G communication network to provision the non-3GPP WIFI/ENET access node over provisioning links.

FIG. 18 illustrates an exemplary operation of 5G communication network 400 to provision WIFE/ENET access node 411 over provisioning links (PROV). The operation may vary in other examples. Provisioning system 425 receives a request from a network operator for an access node metric for WIFI/ENET access node 411. Provisioning system 425 transfers an N3IWF API call for the access node metric to 5GC N3IWF 421. 5GC N3IWF 421 receives the N3IWF API call for the access node metric and responsively transfers an access node API call for the access node metric to the NET in WIFI/ENET access node 411 over the provisioning links. In response, the NET in WIFI/ENET access node 411 identifies the access node metric and transfers an access node API response indicating the access node metric to 5GC N3IWF 421 over the provisioning links. 5GC N3IWF 421 transfers an N3IWF API response to 5GC provisioning system 425. Provisioning system 425 reports the access node metric for WIFI/ENET access node 411 to the network operator.

The wireless data network circuitry described above comprises computer hardware and software that form special-purpose network circuitry to provision network functions using 3GPP signaling. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose network circuitry to provision network functions using 3GPP signaling.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating wireless communication network to provision network functions over Third Generation Partnership Project (3GPP) signaling links, the method comprising:
a User Plane Function (UPF) exchanging user data with a User Equipment (UE) over an access node;
a provisioning data system transferring a Session Management Function (SMF) Application Programming Interface (API) call for a UPF metric to an SMF;
the SMF receiving the SMF API call and responsively transferring a UPF API call for the UPF metric in a 3GPP N4 signaling message to the UPF;
the UPF receiving the UPF API call for the UPF metric in the 3GPP N4 signaling message, and in response, determining the UPF metric and transferring a UPF API response indicating the UPF metric in another 3GPP N4 signaling message to the SMF;
the SMF receiving the UPF API response indicating the UPF metric in the other 3GPP N4 signaling message and responsively transferring an SMF API response indicating the UPF metric to the provisioning data system; and
the provisioning data system receiving the SMF API response indicating the UPF metric.

2. The method of claim 1 further comprising:
the provisioning data system transferring another SMF API call for a UE metric to the SMF;
the SMF receiving the other SMF API call and responsively transferring a UE API call for the UE metric in a 3GPP N1 signaling message to the UE;
the UE receiving the UE API call for the UE metric in the 3GPP N1 signaling message, and in response, determining the UE metric and transferring a UE API response indicating the UE metric in another 3GPP N1 signaling message to the SMF;
the SMF receiving the UE API response indicating the UE metric in the other 3GPP N1 signaling message and responsively transferring another SMF API response indicating the UE metric to the provisioning data system; and
the provisioning data system receiving the other SMF API response indicating the UE metric.

3. The method of claim 1 further comprising:
the provisioning data system transferring another SMF API call for a UE metric to the SMF;
the SMF receiving the other SMF API call and responsively transferring a UE API call for the UE metric in a 3GPP N1 signaling message to the UE over an N1 signaling link that traverses a Non-3GPP Interworking Function (N3IWF) and a non-3GPP access node;
the UE receiving the UE API call for the UE metric in the 3GPP N1 signaling message, and in response, determining the UE metric and transferring a UE API response indicating the UE metric in another 3GPP N1 signaling message over the N1 signaling link that traverses the N3IWF and the non-3GPP access node to the SMF;
the SMF receiving the UE API response indicating the UE metric in the other 3GPP N1 signaling message and responsively transferring another SMF API response indicating the UE metric to the provisioning data system; and the provisioning data system receiving the other SMF API response indicating the UE metric.

4. The method of claim 1 further comprising:
the provisioning data system transferring another SMF API call for a Non-3GPP Interworking Function (N3IWF) metric to the SMF;
the SMF receiving the other SMF API call and responsively transferring an N3IWF API call for the N3IWF metric in a 3GPP N2 signaling message to the N3IWF;
the N3IWF receiving the N3IWF API call for the N3IWF metric in the 3GPP N2 signaling message, and in response, determining the N3IWF metric and transferring a N3IWF API response indicating the N3IWF metric in another 3GPP N2 signaling message to the SMF;
the SMF receiving the N3IWF API response indicating the N3IWF metric in the other 3GPP N2 signaling message and responsively transferring another SMF API response indicating the N3IWF metric to the provisioning data system; and
the provisioning data system receiving the other SMF API response indicating the N3IWF metric.

5. The method of claim 1 wherein the access node comprises a 3GPP access node and further comprising:
the provisioning data system transferring another SMF API call for an access node metric to the SMF;
the SMF receiving the other SMF API call and responsively transferring an access node API call for the access node metric in a 3GPP N2 signaling message to the 3GPP access node;
the 3GPP access node receiving the access node API call for the access node metric in the 3GPP N2 signaling message, and in response, determining the access node metric and transferring an access node API response indicating the access node metric in another 3GPP N2 signaling message to the SMF;
the SMF receiving the access node API response indicating the access node metric in the other 3GPP N2 signaling message and responsively transferring another SMF API response indicating the access node metric to the provisioning data system; and
the provisioning data system receiving the other SMF API response indicating the access node metric.

6. The method of claim 1 further comprising:
the provisioning data system transferring an Access and Mobility Management Function (AMF) API call for a UE metric to an AMF;
the AMF receiving the AMF API call and responsively transferring a UE API call for the UE metric in a 3GPP N1 signaling message to the UE;
the UE receiving the UE API call for the UE metric in the 3GPP N1 signaling message, and in response, determining the UE metric and transferring a UE API response indicating the UE metric in another 3GPP N1 signaling message to the AMF;
the AMF receiving the UE API response indicating the UE metric in the other 3GPP N1 signaling message and responsively transferring an AMF API response indicating the UE metric to the provisioning data system; and
the provisioning data system receiving the AMF API response indicating the UE metric.

7. The method of claim 1 further comprising:
the provisioning data system transferring an Access and Mobility Management Function (AMF) API call for a Non-3GPP Interworking Function (N3IWF) metric to an AMF;
the AMF receiving the AMF API call and responsively transferring an N3IWF API call for the N3IWF metric in a 3GPP N2 signaling message to the N3IWF;
the N3IWF receiving the N3IWF API call for the N3IWF metric in the 3GPP N2 signaling message, and in response, determining the N3IWF metric and transferring a N3IWF API response indicating the N3IWF metric in another 3GPP N2 signaling message to the AMF;
the AMF receiving the N3IWF API response indicating the N3IWF metric in the other 3GPP N2 signaling message and responsively transferring an AMF API response indicating the N3IWF metric to the provisioning data system; and
the provisioning data system receiving the AMF API response indicating the N3IWF metric.

8. The method of claim 1 wherein the access node comprises a 3GPP access node and further comprising:
the provisioning data system transferring an Access and Mobility Management Function (AMF) API call for an access node metric to an AMF;
the AMF receiving the AMF API call and responsively transferring an access node API call for the access node metric in a 3GPP N2 signaling message to the 3GPP access node;
the 3GPP access node receiving the access node API call for the access node metric in the 3GPP N2 signaling message, and in response, determining the access node metric and transferring an access node API response indicating the access node metric in another 3GPP N2 signaling message to the AMF;
the AMF receiving the access node API response indicating the access node metric in the other 3GPP N2 signaling message and responsively transferring another AMF API response indicating the access node metric to the provisioning data system; and
the provisioning data system receiving the AMF API response indicating the access node metric.

9. The method of claim 1 further comprising:
the provisioning data system transferring a Non-3GPP Interworking Function (N3IWF) API call for a UE metric to an N3IWF;
the N3IWF receiving the N3IWF API call and responsively transferring a UE API call for the UE metric in a non-3GPP NWu signaling message to the UE;
the UE receiving the UE API call for the UE metric in the non-3GPP NWu signaling message, and in response, determining the UE metric and transferring a UE API response indicating the UE metric in another non-3GPP NWu signaling message to the N3IWF;
the N3IWF receiving the UE API response indicating the UE metric in the other non-3GPP NWu signaling message and responsively transferring an N3IWF API response indicating the UE metric to the provisioning data system; and
the provisioning data system receiving the N3IWF API response indicating the UE metric.

10. The method of claim 1 wherein the access node comprises a non-3GPP access node and further comprising:
the provisioning data system transferring a Non-3GPP Interworking Function (N3IWF) API call for an access node metric to an N3IWF;
the N3IWF receiving the N3IWF API call and responsively transferring an access node API call for the access node metric in a non-3GPP provisioning message to the non-3GPP access node;

the non-3GPP access node receiving the access node API call for the access node metric in the non-3GPP provisioning message, and in response, determining the access node metric and transferring an access node API response indicating the access node metric in another non-3GPP provisioning message to the N3IWF;

the N3IWF receiving the access node API response indicating the access node metric in the other non-3GPP provisioning message and responsively transferring an N3IWF API response indicating the access node metric to the provisioning data system; and the provisioning data system receiving the N3IWF API response indicating the access node metric.

11. A wireless communication network configured to provision network functions over Third Generation Partnership Project (3GPP) signaling links, the wireless communication network comprising:

a User Plane Function (UPF) configured to exchange user data with a User Equipment (UE) over an access node;

a provisioning data system configured to transfer a Session Management Function (SMF) Application Programming Interface (API) call for a UPF metric to an SMF;

the SMF configured to receive the SMF API call and responsively transfer a UPF API call for the UPF metric in a 3GPP N4 signaling message to the UPF;

the UPF configured to receive the UPF API call for the UPF metric in the 3GPP N4 signaling message, and in response, determine the UPF metric and transfer a UPF API response indicating the UPF metric in another 3GPP N4 signaling message to the SMF;

the SMF configured to receive the UPF API response indicating the UPF metric in the other 3GPP N4 signaling message and responsively transfer an SMF API response indicating the UPF metric to the provisioning data system; and the provisioning data system configured to receive the SMF API response indicating the UPF metric.

12. The wireless communication network of claim 11 further comprising:

the provisioning data system configured to transfer another SMF API call for a UE metric to the SMF;

the SMF configured to receive the other SMF API call and responsively transfer a UE API call for the UE metric in a 3GPP N1 signaling message to the UE;

the UE configured to receive the UE API call for the UE metric in the 3GPP N1 signaling message, and in response, determine the UE metric and transfer a UE API response indicating the UE metric in another 3GPP N1 signaling message to the SMF;

the SMF configured to receive the UE API response indicating the UE metric in the other 3GPP N1 signaling message and responsively transfer another SMF API response indicating the UE metric to the provisioning data system; and the provisioning data system configured to receive the other SMF API response indicating the UE metric.

13. The wireless communication network of claim 11 further comprising:

the provisioning data system configured to transfer another SMF API call for a UE metric to the SMF;

the SMF configured to receive the other SMF API call and responsively transfer a UE API call for the UE metric in a 3GPP N1 signaling message to the UE over an N1 signaling link that traverses a Non-3GPP Interworking Function (N3IWF) and a non-3GPP access node;

the UE configured to receive the UE API call for the UE metric in the 3GPP N1 signaling message, and in response, determine the UE metric and transfer a UE API response indicating the UE metric in another 3GPP N1 signaling message over the N1 signaling link that traverses the N3IWF and the non-3GPP access node to the SMF;

the SMF configured to receive the UE API response indicating the UE metric in the other 3GPP N1 signaling message and responsively transfer another SMF API response indicating the UE metric to the provisioning data system; and the provisioning data system configured to receive the other SMF API response indicating the UE metric.

14. The wireless communication network of claim 11 further comprising:

the provisioning data system configured to transfer another SMF API call for a Non-3GPP Interworking Function (N3IWF) metric to the SMF;

the SMF configured to receive the other SMF API call and responsively transferring an N3IWF API call for the N3IWF metric in a 3GPP N2 signaling message to the N3IWF;

the N3IWF configured to receive the N3IWF API call for the N3IWF metric in the 3GPP N2 signaling message, and in response, determine the N3IWF metric and transfer a N3IWF API response indicating the N3IWF metric in another 3GPP N2 signaling message to the SMF;

the SMF configured to receive the N3IWF API response indicating the N3IWF metric in the other 3GPP N2 signaling message and responsively transfer another SMF API response indicating the N3IWF metric to the provisioning data system; and the provisioning data system configured to receive the other SMF API response indicating the N3IWF metric.

15. The wireless communication network of claim 11 wherein the access node comprises a 3GPP access node and further comprising:

the provisioning data system configured to transfer another SMF API call for an access node metric to the SMF;

the SMF configured to receive the other SMF API call and responsively transfer an access node API call for the access node metric in a 3GPP N2 signaling message to the 3GPP access node;

the 3GPP access node configured to receive the access node API call for the access node metric in the 3GPP N2 signaling message, and in response, determine the access node metric and transfer an access node API response indicating the access node metric in another 3GPP N2 signaling message to the SMF;

the SMF configured to receive the access node API response indicating the access node metric in the other 3GPP N2 signaling message and responsively transfer another SMF API response indicating the access node metric to the provisioning data system; and the provisioning data system configured to receive the other SMF API response indicating the access node metric.

16. The wireless communication network of claim 11 further comprising:

the provisioning data system configured to transfer an Access and Mobility Management Function (AMF) API call for a UE metric to an AMF;

the AMF configured to receive the other AMF API call and responsively transfer a UE API call for the UE metric in a 3GPP N1 signaling message to the UE;

the UE configured to receive the UE API call for the UE metric in the 3GPP N1 signaling message, and in response, determine the UE metric and transfer a UE API response indicating the UE metric in another 3GPP N1 signaling message to the AMF;

the AMF configured to receive the UE API response indicating the UE metric in the other 3GPP N1 signaling message and responsively transfer an AMF API response indicating the UE metric to the provisioning data system; and the provisioning data system configured to receive the AMF API response indicating the UE metric.

17. The wireless communication network of claim 11 further comprising:

the provisioning data system configured to transfer an Access and Mobility Management Function (AMF) API call for a Non-3GPP Interworking Function (N3IWF) metric to an AMF;

the AMF configured to receive the AMF API call and responsively transfer an N3IWF API call for the N3IWF metric in a 3GPP N2 signaling message to the N3IWF;

the N3IWF configured to receive the N3IWF API call for the N3IWF metric in the 3GPP N2 signaling message, and in response, determine the N3IWF metric and transfer a N3IWF API response indicating the N3IWF metric in another 3GPP N2 signaling message to the AMF;

the AMF configured to receive the N3IWF API response indicating the N3IWF metric in the other 3GPP N2 signaling message and responsively transfer an AMF API response indicating the N3IWF metric to the provisioning data system; and the provisioning data system configured to receive the AMF API response indicating the N3IWF metric.

18. The wireless communication network of claim 11 further comprising:

the provisioning data system configured to transfer an Access and Mobility Management Function (AMF) API call for an access node metric to an AMF;

the AMF configured to receive the AMF API call and responsively transfer an access node API call for the access node metric in a 3GPP N2 signaling message to a 3GPP access node;

the 3GPP access node configured to receive the access node API call for the access node metric in the 3GPP N2 signaling message, and in response, determine the access node metric and transfer an access node API response indicating the access node metric in another 3GPP N2 signaling message to the AMF;

the AMF configured to receive the access node API response indicating the access node metric in the other 3GPP N2 signaling message and responsively transfer an AMF API response indicating the access node metric to the provisioning data system; and the provisioning data system configured to receive the AMF API response indicating the access node metric.

19. The wireless communication network of claim 11 further comprising:

the provisioning data system configured to transfer a Non-3GPP Interworking Function (N3IWF) API call for a UE metric to an N3IWF;

the N3IWF configured to receive the N3IWF API call and responsively transfer a UE API call for the UE metric in a non-3GPP NWu signaling message to the UE;

the UE configured to receive the UE API call for the UE metric in the non-3GPP NWu signaling message, and in response, determine the UE metric and transfer a UE API response indicating the UE metric in another non-3GPP NWu signaling message to the N3IWF;

the N3IWF configured to receive the UE API response indicating the UE metric in the other non-3GPP NWu signaling message and responsively transfer an N3IWF API response indicating the UE metric to the provisioning data system; and the provisioning data system configured to receive the N3IWF API response indicating the UE metric.

20. The wireless communication network of claim 11 wherein the access node comprises a non-3GPP access node and further comprising:

the provisioning data system configured to transfer a Non-3GPP Interworking Function (N3IWF) API call for an access node metric to an N3IWF;

the N3IWF configured to receive the N3IWF API call and responsively transfer an access node API call for the access node metric in a non-3GPP provisioning message to the non-3GPP access node;

the non-3GPP access node configured to receive the access node API call for the access node metric in the non-3GPP provisioning message, and in response, determine the access node metric and transfer an access node API response indicating the access node metric in another non-3GPP provisioning message to the N3IWF;

the N3IWF configured to receive the access node API response indicating the access node metric in the other non-3GPP provisioning message and responsively transfer an N3IWF API response indicating the access node metric to the provisioning data system; and the provisioning data system configured to receive the N3IWF API response indicating the access node metric.

* * * * *